(12) United States Patent
Kumar et al.

(10) Patent No.: US 9,146,945 B2
(45) Date of Patent: Sep. 29, 2015

(54) AUTOMATED SYSTEM AND METHOD OF DATA SCRUBBING

(71) Applicant: Tata Consultancy Services Limited, Mumbai (IN)

(72) Inventors: Rajive Kumar, Gurgaon (IN); Vinit Pandey, Gurgaon (IN); Sandhi Rastogi, Gurgaon (IN); Tuhina Sharma, Haryana (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 269 days.

(21) Appl. No.: 13/845,936

(22) Filed: Mar. 18, 2013

(65) Prior Publication Data

US 2013/0262406 A1    Oct. 3, 2013

(30) Foreign Application Priority Data

Apr. 3, 2012    (IN) .......................... 1091/MUM/2012

(51) Int. Cl.
*G06F 17/30*    (2006.01)

(52) U.S. Cl.
CPC .... *G06F 17/30303* (2013.01); *G06F 17/30569* (2013.01)

(58) Field of Classification Search
USPC ................................................. 707/687–692
See application file for complete search history.

(56) References Cited

U.S. PATENT DOCUMENTS

| | | | |
|---|---|---|---|
| 5,893,111 A * | 4/1999 | Sharon et al. ................. | 707/688 |
| 6,970,881 B1 * | 11/2005 | Mohan et al. ......................... | 1/1 |
| 7,194,483 B1 * | 3/2007 | Mohan et al. ................. | 707/600 |
| 7,536,413 B1 * | 5/2009 | Mohan et al. ......................... | 1/1 |
| 7,565,335 B2 * | 7/2009 | Tang et al. ....................... | 706/20 |
| 7,882,209 B1 * | 2/2011 | Eslambolchi et al. ........ | 709/223 |
| 7,953,705 B2 * | 5/2011 | Chron et al. ................... | 707/662 |
| 8,161,045 B2 * | 4/2012 | Arnold et al. ................. | 707/736 |
| 8,468,160 B2 * | 6/2013 | Hassanzadeh et al. ....... | 707/748 |
| 8,527,475 B1 * | 9/2013 | Rammohan et al. .......... | 707/692 |
| 8,635,029 B2 * | 1/2014 | Gustafsson et al. ............ | 702/20 |
| 8,639,670 B2 * | 1/2014 | Mineno ......................... | 707/692 |
| 8,712,973 B2 * | 4/2014 | Ramachandran ............. | 707/691 |
| 8,756,205 B2 * | 6/2014 | Fust et al. ..................... | 707/690 |
| 8,799,234 B2 * | 8/2014 | Gulwani et al. ............... | 707/687 |
| 8,825,577 B2 * | 9/2014 | Fokoue et al. .................. | 706/46 |
| 8,843,501 B2 * | 9/2014 | Allen et al. ................... | 707/749 |
| 2002/0087515 A1 * | 7/2002 | Swannack et al. ................ | 707/2 |
| 2002/0091685 A1 * | 7/2002 | Feldman et al. .................. | 707/5 |
| 2003/0061212 A1 * | 3/2003 | Smith et al. ....................... | 707/6 |
| 2003/0115080 A1 * | 6/2003 | Kasravi et al. .................... | 705/1 |
| 2004/0236620 A1 * | 11/2004 | Chauhan et al. .................. | 705/9 |
| 2005/0033726 A1 * | 2/2005 | Wu et al. ........................... | 707/1 |
| 2005/0060313 A1 * | 3/2005 | Naimat et al. .................... | 707/7 |
| 2005/0071370 A1 * | 3/2005 | Altschul et al. ............ | 707/104.1 |

(Continued)

OTHER PUBLICATIONS

TcS BaNCS Overview (Aug. 2010) New Zealand Clearing Corp (12 pages).

(Continued)

*Primary Examiner* — Hanh Thai

(74) *Attorney, Agent, or Firm* — Finnegan, Henderson, Farabow, Garrett & Dunner, LLP

(57) ABSTRACT

A system and method enabling automated data cleansing and scrubbing at the attribute level is disclosed. A consolidated view may be provided of the scrubbed data or narratives that gets promoted to a final copy and the data or narratives received from multiple sources on a single user interface.

20 Claims, 26 Drawing Sheets

(56) References Cited

U.S. PATENT DOCUMENTS

| | | | | |
|---|---|---|---|---|
| 2006/0238919 | A1* | 10/2006 | Bradley | 360/128 |
| 2007/0038657 | A1* | 2/2007 | Denton et al. | 707/101 |
| 2008/0208652 | A1* | 8/2008 | Srivastava | 705/7 |
| 2008/0249981 | A1* | 10/2008 | Norring et al. | 707/2 |
| 2008/0270363 | A1* | 10/2008 | Hunt et al. | 707/3 |
| 2008/0294996 | A1* | 11/2008 | Hunt et al. | 715/739 |
| 2008/0312942 | A1* | 12/2008 | Katta et al. | 705/1 |
| 2009/0018996 | A1* | 1/2009 | Hunt et al. | 707/2 |
| 2009/0182653 | A1* | 7/2009 | Zimiles | 705/30 |
| 2011/0320400 | A1 | 12/2011 | Namini | |
| 2012/0215791 | A1* | 8/2012 | Malik et al. | 707/749 |
| 2013/0246371 | A1* | 9/2013 | Ahuja et al. | 707/692 |

OTHER PUBLICATIONS

Rahm, E. et al., "Data Cleaning: Problems and Current Approaches," University of Leipzig, Germany, http://dbs_uni-leipzig.de, pp. 1-11.

Pon, K. R. et al., "Data Quality Inference," IQIS 2005, Jun. 17, 2005, Baltimore, MD, USA, pp. 105-111.

Marchetti, L. et al., "Improving Tracking by Integrating Reliability of Multiple Sources," pp. 1101-1108.

Singh, R. et al., "A Descriptive Classification of Causes of Data Quality Problems in Data Warehousing," International Journal of Computer Science Issues, vol. 7, Issue 3, No. 2, May 2010 p. 41-50.

* cited by examiner

| | | | | |
|---|---|---|---|---|
| REDS - REDEMPTION INTO SHARE | 93404317S - ISIN174C1009<br>XYZ SECURITIES LTD | US | COMP | You are logged in as:SANDHIZ |
| MANO | US - 47 ABC BANK | EQUITY - ORDINARY SHARE | | INCOMING UNDER PROCESSING |

| | Golden Copy | | DEP SOURCE | | AGENT SOURCE | |
|---|---|---|---|---|---|---|
| General Information | | | | | | |
| Link Corporate Action Reference | | | | | | |
| Financial Instrument Attributes | | | | | | |
| Maturity Date | 12-DEC-2011 | ✔ | 12-DEC-2011 | | 12-DEC-2011 | |
| Details | | | | | | |
| Announcement Date | 04-AUG-2011 | | 04-AUG-2011 | | 04-AUG-2011 | |
| Index Fixing Date | 01-SEP-2011 | ✔ | 01-SEP-2011 | | 01-SEP-2011 | |
| Maximum Price | 178 PRCT | ✔ | 178 PRCT | | 178 PRCT | |
| Minimum Price | 120 PRCT | ✔ | 120 PRCT | | 120 PRCT | |
| Certification Flag | Yes | | | | | |
| Certification Format Indicator | PHYS | ✔ | PHYS | | PHYS | |
| Corporate Action Options | | | | | | |
| 001 - Cash Option | | | | | | |
| CA Option Code | Cash | | Cash | | Cash | |
| Country of Non Domicile | US | ✔ | US | | US | |
| *Option Features Indicator* | CAOS | C ✔ | CAOS | | CAOS | |
| Option Status | INTV | | INTV | | | |
| Certification Type Indicator | NDOM | ✔ | NDOM | | NDOM | |
| Payment Currency-Currency Option | USD | ✔ | USD | | USD | |

| Ranking Attribute Rule Details | | | |
|---|---|---|---|
| Event Type : | STOCK DIVIDEND | Promotion Threshold : | 6 |
| Market : | ALL | Confirmation Threshold : | 8 |
| Depository Code : | ALL | Task Level : | 4 |
| Security Type : | ALL | Processing Type : | CS |
| Internal Flag : | NONE | Status : | AUTHORISED |
| Exercise Proceed Type : | ALL | | |

Figure 9

| ISO Short Name | Significance | Option Type | Movement | Credit/Debit | AGENT GEN. - 10387 | DEP - 1969 | MANUAL HIGH - 1967 |
|---|---|---|---|---|---|---|---|
| Announcement Date | V | None | None | None | 0 | 6 | 14 |
| Ex Date | O | None | None | None | 2 | 6 | 14 |
| Payment Date | MS | None | Secmove | None | 2 | 6 | 14 |
| Payment Date | MS | None | Cashmove | None | 2 | 6 | 14 |
| Record Date | M | None | None | None | 2 | 6 | 14 |
| Additional for Existing Securities | MS | Security | Secmove | Credit | 2 | 6 | 14 |
| Charges/Fee Amount | O | Security | Cashmove | None | 2 | 6 | 14 |
| Resulting Security Number | M | None | None | None | 6 | 6 | 14 |
| Technical Option Number | V | None | None | None | 6 | 0 | 0 |
| CA Suboption number | V | None | Secmove | None | 0 | 0 | 0 |
| CA Suboption number | V | None | Cashmove | None | 0 | 0 | 0 |
| Link Corp Id | O | None | None | None | 0 | 0 | 14 |
| Credit/Debit | M | None | Cashmove | None | 8 | 6 | 14 |
| Credit/Debit | M | None | Secmove | None | 8 | 6 | 14 |
| Disposition of Fractions | MS | None | None | None | 2 | 6 | 14 |
| Default Option Flag | M | None | None | None | 8 | 6 | 14 |
| CA Option Code | V | None | None | None | 0 | 6 | 14 |

AUTOMATED SYSTEM AND METHOD OF DATA SCRUBBING

CROSS-REFERENCE TO RELATED PATENT APPLICATION

The present application claims priority under 35 U.S.C. §119 to Indian Patent Application No. 1091/MUM/2012, filed Apr. 3, 2012. The aforementioned application is incorporated herein by reference in its entirety.

TECHNICAL FIELD

The present disclosure generally relates to data processing and management processes and, more particularly, to an autonomic system and method of performing data cleansing and scrubbing at the field level and presenting the consolidated view thereof on a single screen.

BACKGROUND

In a typical Corporate Action Announcement process, multiple messages are usually procured from numerous sources that may even involve the message interpretation and translation by several intermediaries. This most often brings about inconsistency and inaccuracy in the information gathered. Further, the currently available methodologies provide source level precedence for the incoming messages, which restricts the entities from choosing the best data available in the market for any event type, particularly in cases where the reliability of the information provided varies from source to source. Since multiple heterogeneous sources extract and transmit the messages ostensibly relating to same data element, much discrepancy has been observed in the field/attribute level information of theoretically the same data.

There has been no robust solution that can automate the process by configuring it to choose one attribute from one source (e.g. Record Date) and another attribute from a different source (e.g. Rate of Interest) for the same announcement. This makes the entity handling heavy messages to rely upon a single best source for data acquisition. Additionally user of the entity is also restricted to decide if there is any potentially conflicting information available in the market. This raises the concern of standardized information obtainment involving best market practices, the said standardization involving scrubbing of data at the field or attribute level.

Furthermore, there is no single point view of data or narratives involving all unformatted and unstructured text that is gathered from numerous sources as well as the data/narratives that gets promoted to the Golden Copy. This makes it difficult for the user to have a consolidated and uniform view of the data/narratives provided from different sources including registrars, depositories, exchanges or data vendors and final data/narrative to be present in the Golden Copy. Also, amidst absence of any standardized message processing system it becomes difficult to even identify the best data that can be promoted to the Golden Copy. There does exist a missing usability for the users to manage the narratives from a single point as the user may not be able to obtain a complete view of the data/narrative received from various sources and present in the Golden Copy. The current environment also does not avail any process that can identify the presence of narrative and identify the difference in narratives provided from replacement messages.

In light of the foregoing, there exists a need for a method of reconciling and cleansing or scrubbing data obtained from various heterogeneous sources at the field level to produce a single authoritative Golden Copy of a Corporate Event. There has further arisen a need to provide a system that is capable of presenting a consolidated view of data/narratives received from various sources and the one that shall be present in the Golden Copy for enhanced analysis and better management.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosures. It is also to be understood that the terminology used in the description is for the purpose of describing particular versions or embodiments only, and is not intended to limit the scope of the present invention which will be limited only by the appended claims.

According to an exemplary embodiment, a computer implemented method and system for performing data scrubbing at attribute level may be provided. The method may comprise: receiving data containing at least one significant or non significant attribute and associated values from distributed data sources, the sources being assigned weight against each of the attribute value; and applying a ranking matrix process to the received data, the ranking process comprising: for sources referring to different values for the same attribute, computing a combined weight therefrom; in response to the combined weight of the significant attribute exceeding a predetermined promotion threshold value, determining if said combined weight exceeds a predetermined confirmation threshold value, in response to the combined weight of the non significant attribute exceeding the promotion threshold value, promoting the non significant attribute to a final templated copy; in response to the combined weight of the significant or non significant being less than the confirmation threshold value, computing a total weight of all values for the attribute from all sources; and in response to the total weight exceeding a predetermined task threshold, raising a work item for a user to create a manual source and reapplying the ranking matrix process.

BRIEF DESCRIPTION OF THE DRAWINGS

The foregoing summary, as well as the following detailed description of preferred embodiments, are better understood when read in conjunction with the appended drawings, wherein like elements are given like reference numerals. For the purpose of illustrating the different embodiments, there is shown in the drawings exemplary methods and systems; however, the disclosure is not limited to the specific methods and system disclosed. In the drawings:

FIG. 5 is a screenshot providing sample visual presentation of an example of the final ranking matrix rule as viewed on a single screen.

FIG. 9 is a screenshot displaying ranking matrix attributes rule details in accordance with one embodiment.

FIG. 10 is a screenshot displaying attribute level details and the weights assigned to sources in accordance with an exemplary embodiment.

Figure 11:
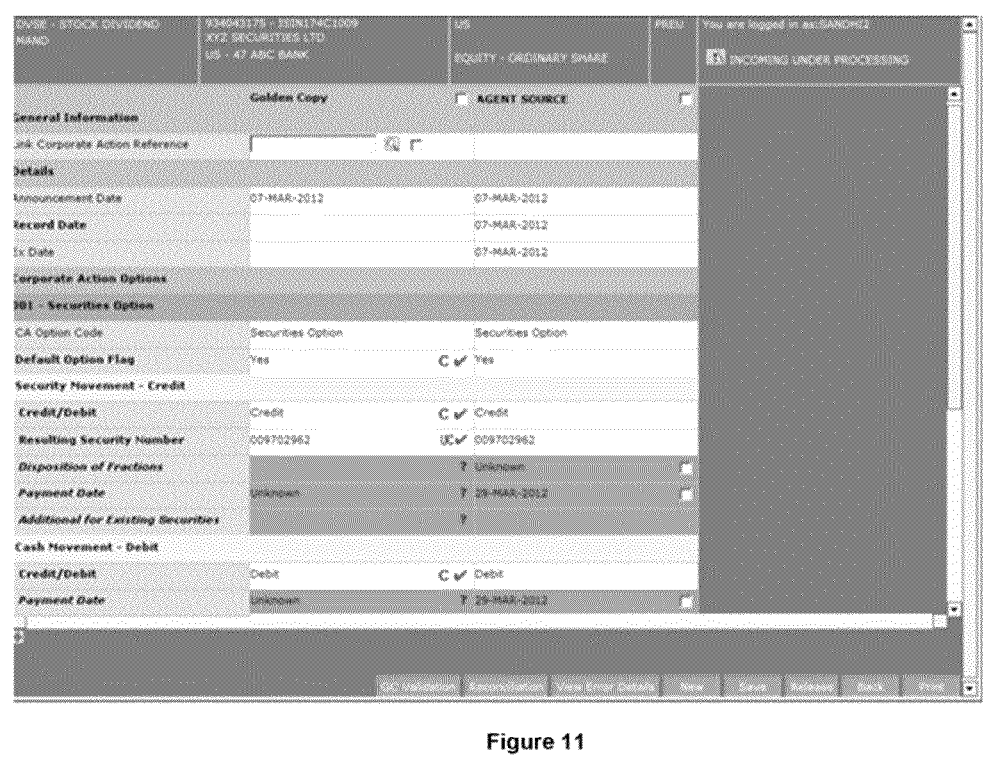

FIG. 11 is a screenshot displaying the results obtained on applying ranking matrix rule on one source data in accordance with one illustrative embodiment.

FIG. 12 is a screenshot displaying the results obtained on applying ranking matrix rule on other source data in accordance with one illustrative embodiment.

FIG. 13 is a screenshot displaying the results obtained on applying ranking matrix rule on manual source data in accordance with one illustrative embodiment.

DETAILED DESCRIPTION

Figure 1:
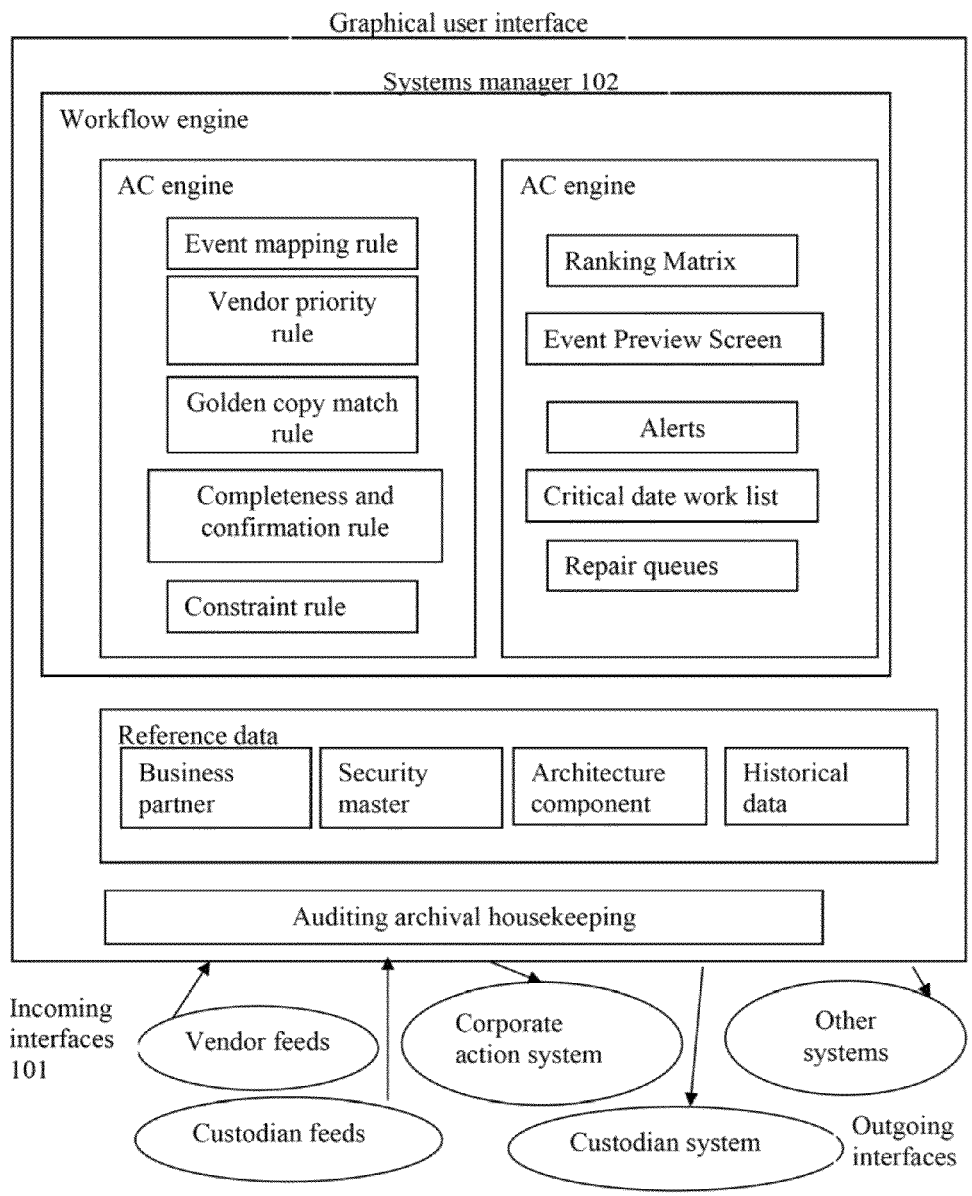
FIG. 1 depicts a block diagram of an exemplary data scrubbing system in which aspects of the illustrative embodiments may be implemented.

Exemplary embodiments illustrating features of the present disclosure will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a" "an," and "the" include plural references unless the context clearly dictates otherwise. Although any systems and methods similar or equivalent to those described herein can be used in the practice or testing of embodiments of the present invention, the preferred systems and methods are now described.

The disclosed embodiments are mere examples and may be embodied in various forms. Software programming code, which embodies aspects of the present disclosure, is typically maintained in a permanent storage such as a computer readable medium. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. Further, a computerized method may refer to a method whose steps are performed by a computing system containing a suitable combination of one or more processors, memory means and storage means.

The illustrative embodiments are described below with reference to flowchart illustrations and/or block diagrams of methods and systems according to the illustrative embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks,

DEFINITIONS a) Attribute: Elements of message signified by the key words. e.g. "Interest Rate", "Period of Interest Calculation", "Payment Date" etc.
b) Cleansing and Scrubbing: Process to identify reliable data available from various information sources.
c) EPS: Event Preview Screen,
d) Conflict: Potential difference in information provided by the trusted sources where user confirmation is required. This term may also be used to signify the absence of Mandatory information from reliable sources.
e) Golden Copy: Final message comprising the best reliable data available from various information sources.
f) GUI: Graphic user Interface.
g) Narrative: unformatted text received/added in the message.
h) Ranking: Weight assigned to the source for a specific attribute.
i) Source: Data Source (Market entities) which provide necessary information to the concerned Business entity.

Broadly, an embodiment of the present disclosure may provide an automated system and a method enabling field level scrubbing of data obtained from disparately located heterogeneous set of multiple sources. An embodiment may further provide a consolidated view of data or narratives that are obtained from various sources as well as the data or narratives present in the Golden Copy on a single user interface. The field level data scrubbing system and method, in accordance with one embodiment, may enable the user to decide the ranking of data that should be assigned per attribute received from various sources. In yet another embodiment, the present system and the method may empower the user to decide the ranking based on his heuristics with regard to the reliability of the source to provide correct information. According to configured ranking, the cleansing and scrubbing of the attributes may be performed and it may be decided whether the attribute will be accepted to be part of Golden Copy or not.

One embodiment of the present disclosure may provide a data cleansing and scrubbing system that is suitable for, but not limited to, applications in corporate action announcements. One embodiment of the present disclosure may, apart from data cleansing and scrubbing at the attribute level, provide a user interfacing screen, hereafter referred to as Event Preview Screen that provides a consolidated tabular view of data/narratives received from various sources and the data/narratives present in the golden copy in a tabular form.

In one other embodiment of the present disclosure, the Event Preview Screen of the present disclosure may enable the user to decide for the best data to be present in the Golden Copy in case of conflicts between data provided from various sources. Another embodiment may enables narrative management through addition or editing of narratives in the Golden Copy and allow the user to promote or demote attributes to/from the final golden copy. Another feature may enable highlighting the difference(s) in the narratives provided in the replacement messages. Also all the erroneous attributes along with the changed attributes may get highlighted.

In one of the other embodiment of the present disclosure, the Event preview Screen may provide flexibility to perform various operations like, but not limited to, modifying the existing source, creation of new source, creating duplicate of existing source, viewing of raw message of incoming message and Golden Copy, Audit Viewing, attribute level and option level conflict resolution, addition of new standard text narratives directly into the Golden Copy etc from a single point.

FIG. 1 depicts a schematic block diagram of a data scrubbing system, according to an embodiment of the disclosure. Broadly, the system 100 may include three major components, namely an input interface 101, a processor unit 102 and a display interface 103. The input interface may be adapted to receive feeds or data from all disparately located heterogeneous data sources. The processor unit 102 may include an executing engine (or a workflow engine) which performs the attribute level cleansing and scrubbing of data by applying ranking matrix rule process and provides decision making and control operations. The processor unit 102 may further include a database that maintains a set of predefined rules, vis a vis event mapping rule, vendor priority rule, Golden Copy match rule, completeness and confirmation rule and constraint rule, ranking matrix rule and historical data. The attributes processed by the executing engine and qualifying the ranking matrix process may get promoted to the Golden Copy. The final copy may be displayed by a display interface 103 or output interface 103, also referred to as the Event Preview Screen.

Figure 2A:
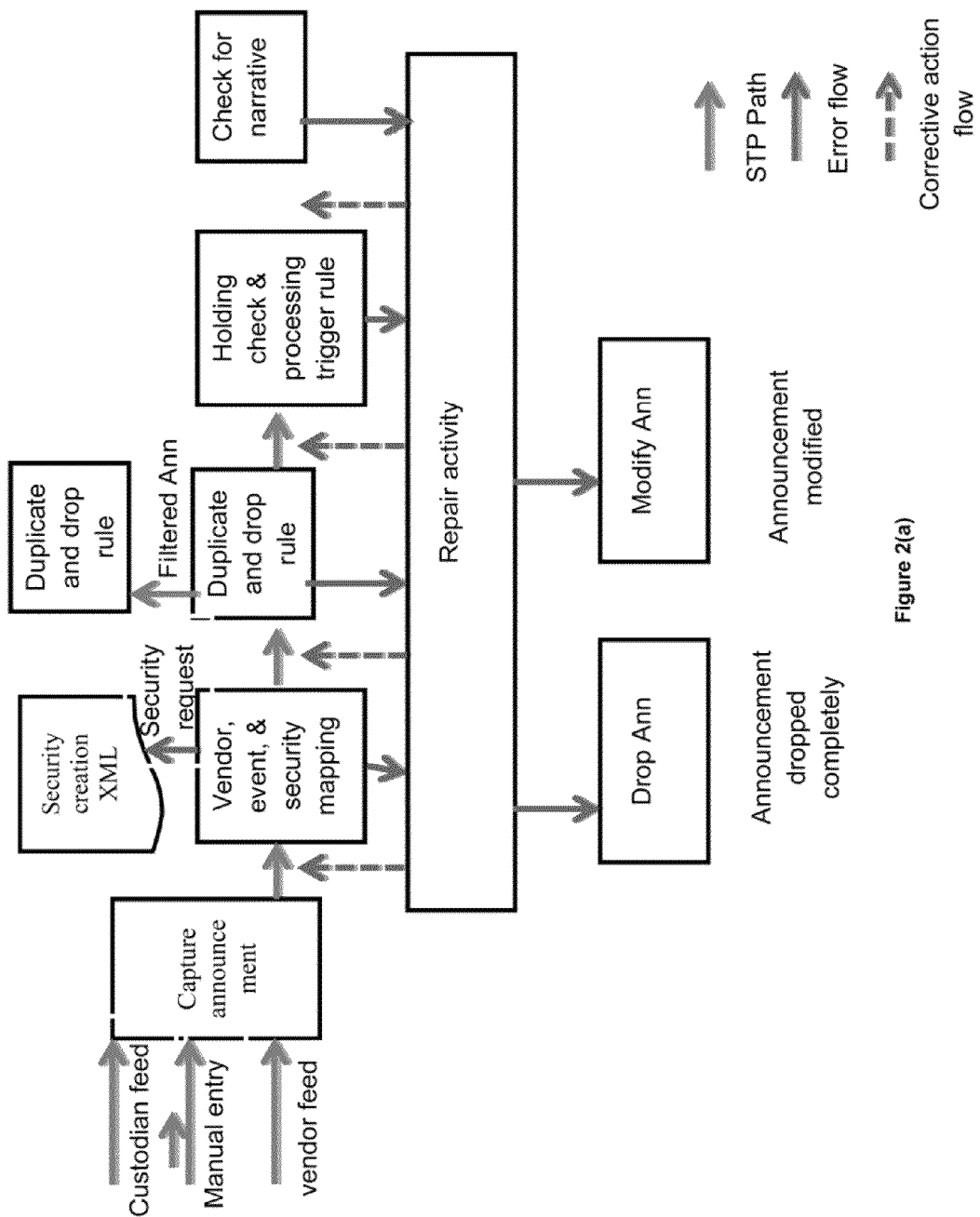
FIGS. 2 (a) and (b) is a flow diagram illustrating a high level view of performing data scrubbing operation in accordance with one of the disclosed embodiments.

Now turning briefly to FIGS. 2 (a) and (b), there is shown a technical flow diagram of performing the data scrubbing operation. As seen and derived, the corporate announcements may be captured from various sources like custodians, vendors or manual entries by the input interface 101. This may be followed by vendor/data provider mapping, event mapping and security mapping in response to a security request. It may be followed by a cleansing mechanism whereby the duplicate entries for an announcement are dropped. A Heldness check may also be performed to ensure that relevant entries are allowed, and following which a trigger rule may be processed. Next, a narrative matching process may be initiated which checks if the incoming data for an announcement is same or not. Eventually a Golden Copy template may be created based on the content of received incoming data. In case the system reports an error, a repair activity may be performed. Upon the rectification of error the attribute may follows the destined Straight through Processing (STP) Path, else the announcement may be either dropped completely or modified, as the need be.

Figure 2B:
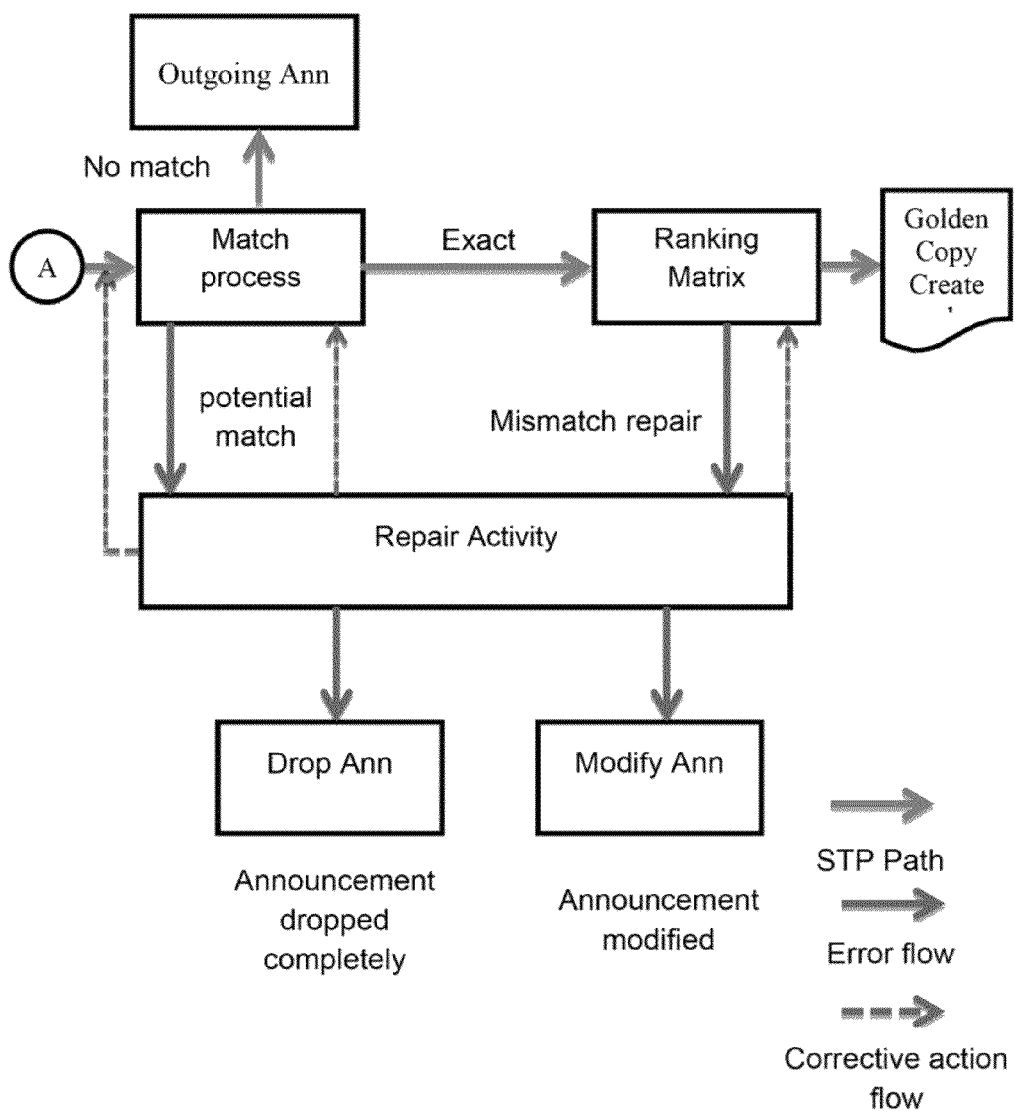

FIG. 2(b) shows an exemplary application of ranking matrix rule after matching of the narrative process is performed. Upon finding an exact match, the ranking matrix rule may be applied. The ranking matrix rule may be a combination of ranking attribute rule and source weighting rule. This rule based on its set up may perform the cleansing and scrubbing of the data received from various sources and finalizes the data to be present in the Golden Copy.

Figure 3A:
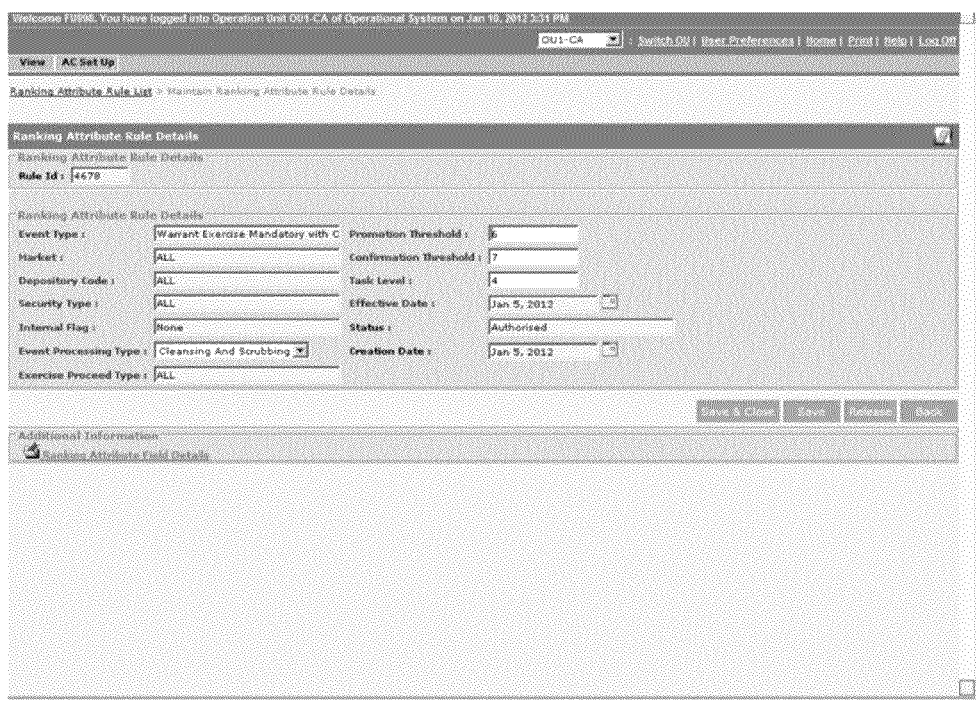
FIGS. 3 (a) and (b) is a screenshot presentation of ranking attribute rule in accordance with one of the disclosed embodiments.
Figure 3B:
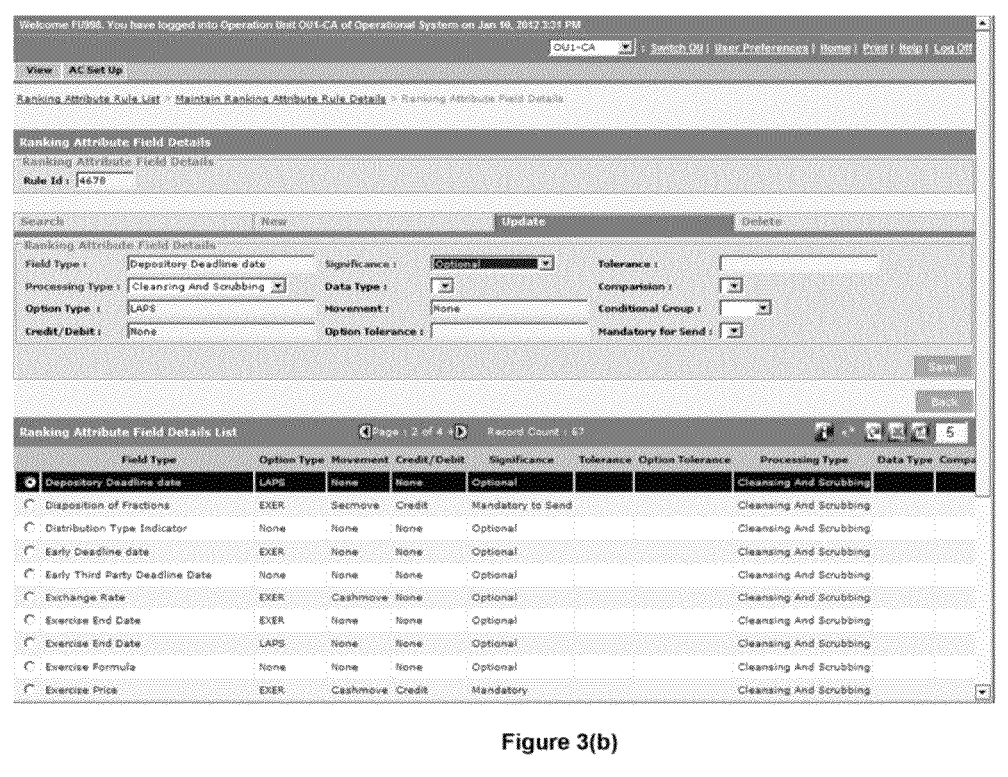

In one aspect of the disclosure the ranking attribute rule of the disclosure may enable the user to introduce a set of well defined expressions. In particular, it may enable the user to define a list of attributes that should be present in a Golden Copy per event, market, depository and security type. In another aspect of the disclosure, the user may be enabled to define the significance (mandatory/optional/mandatory to send/view only) for each of the attributes that should be present in the Golden Copy. The significance of the attribute may decide completeness of the Golden Copy. In one other aspect of the disclosure the user may define the promotion and confirmation threshold at event level. Also, the user may define the tolerance per attribute that should be taken into account while comparing the data received from various sources. FIGS. 3 (a) and (b) provide sample visual presentation of the stated information regarding Ranking attribute rule.

Figure 4A:
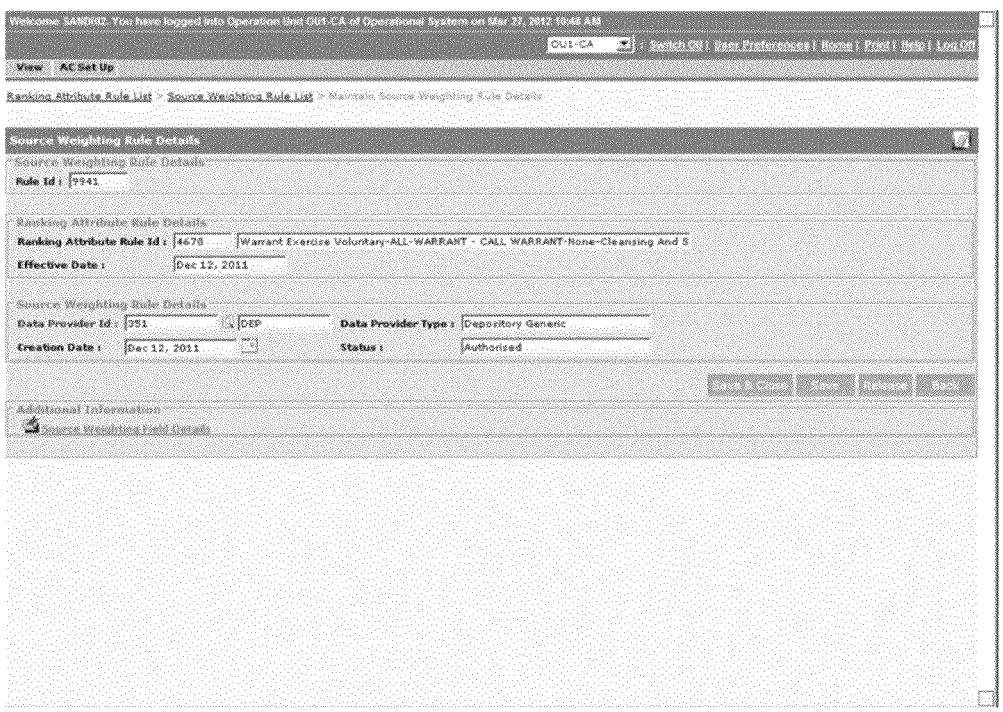
FIGS. 4(a) and (b) is a screenshot presentation of source weighing rule in accordance with one embodiment.
Figure 4B:
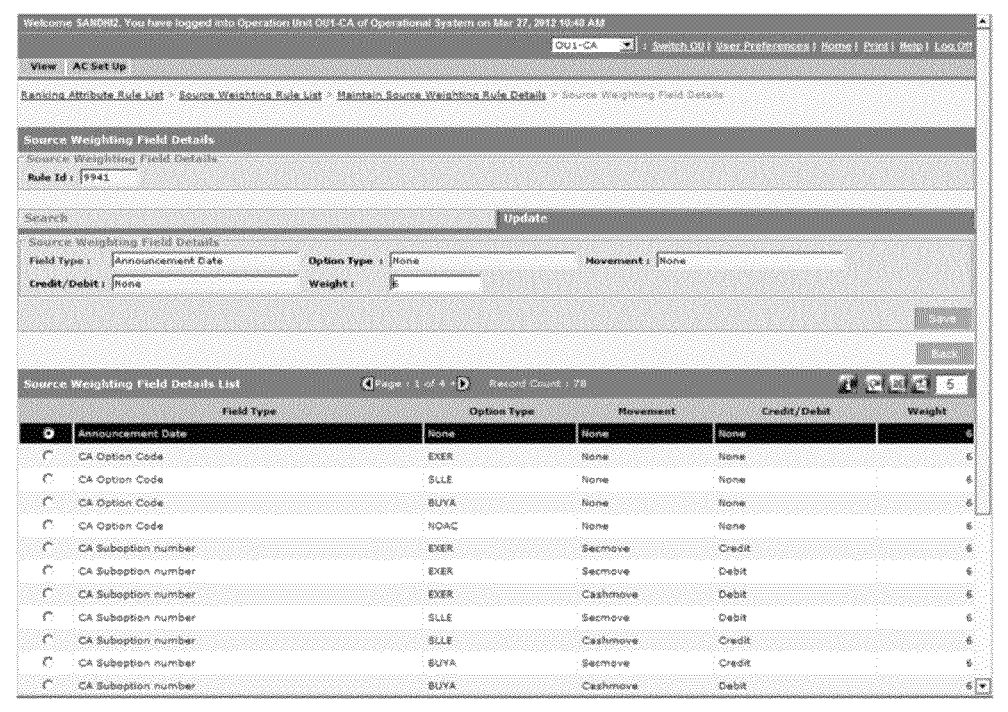
Figure 5:
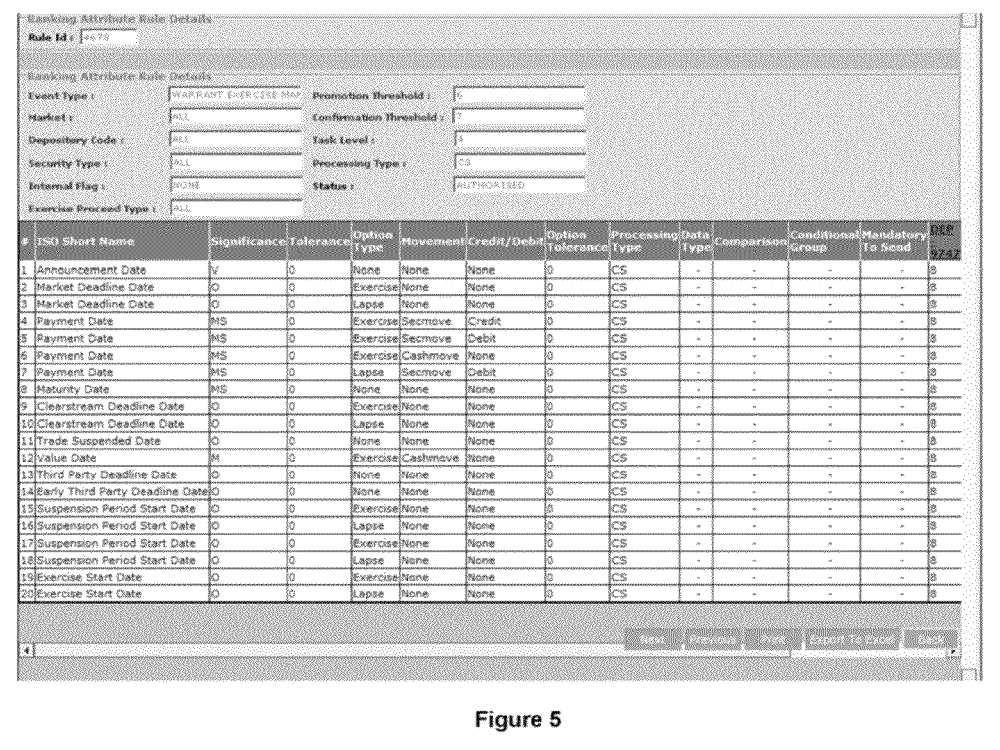

Next, the features of other component of the ranking matrix rule, for example, the Source weighting rule are defined. In an embodiment of the present disclosure, the source weighting rule may be destined to be created at the source level. This rule may be a child to the ranking matrix rule. It may enable the user to define the weights for each attribute obtained from each source. This weight may then be used for calculation of composite weight of the most reliable value. This composite weight may be compared with the promotion and confirmation threshold to decide whether the attribute can be promoted to Golden Copy or not and if it is confirmed or not. FIGS. 4(a) and (b) provides sample visual presentation of the stated information regarding source weighing rule. Further, FIG. 5 represents an example of the final ranking matrix rule as viewed on a single screen.

Figure 6A:
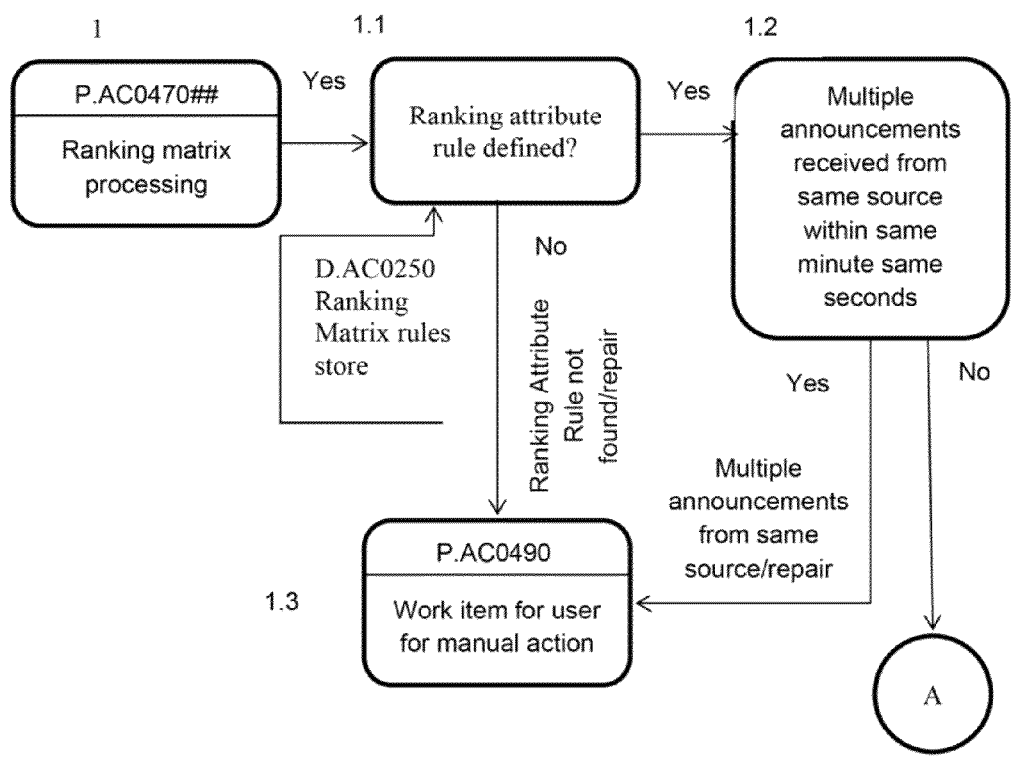
FIG. 6(a), 6(b), 6(c) illustrate an exemplary flow diagram representing the sequence of steps followed in a ranking matrix application process.
Figure 6B:
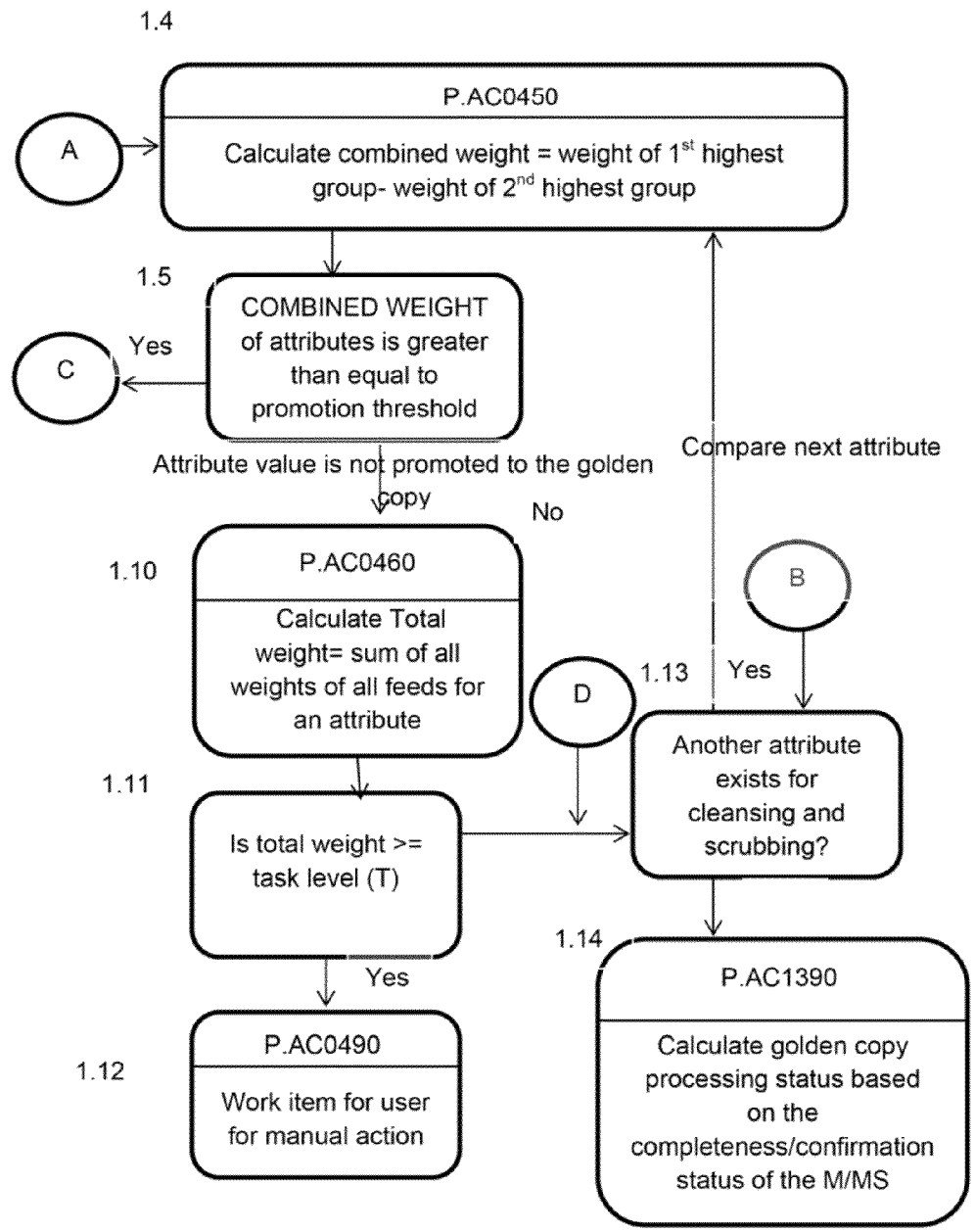
Figure 6C:
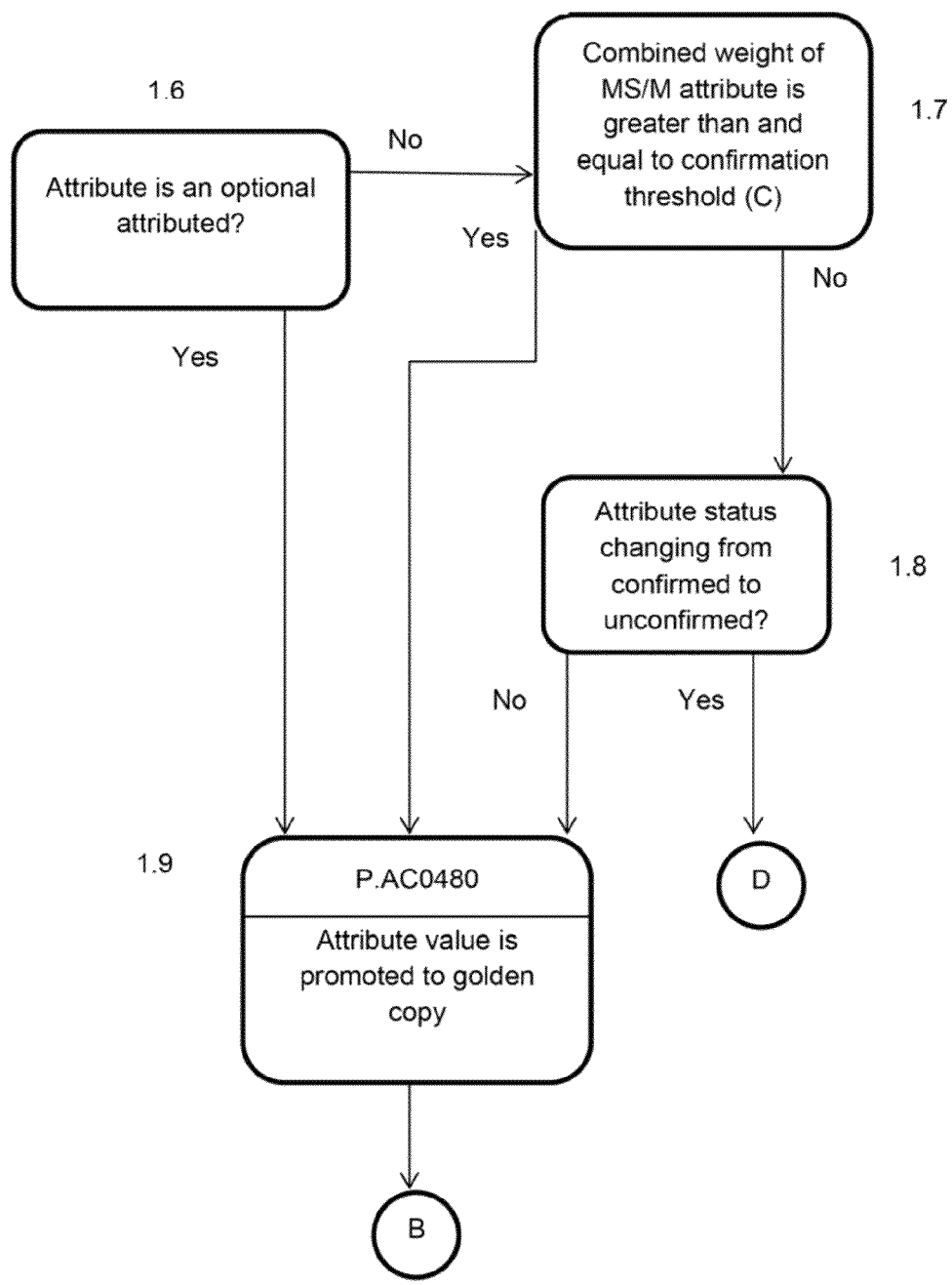
Figure 7A:
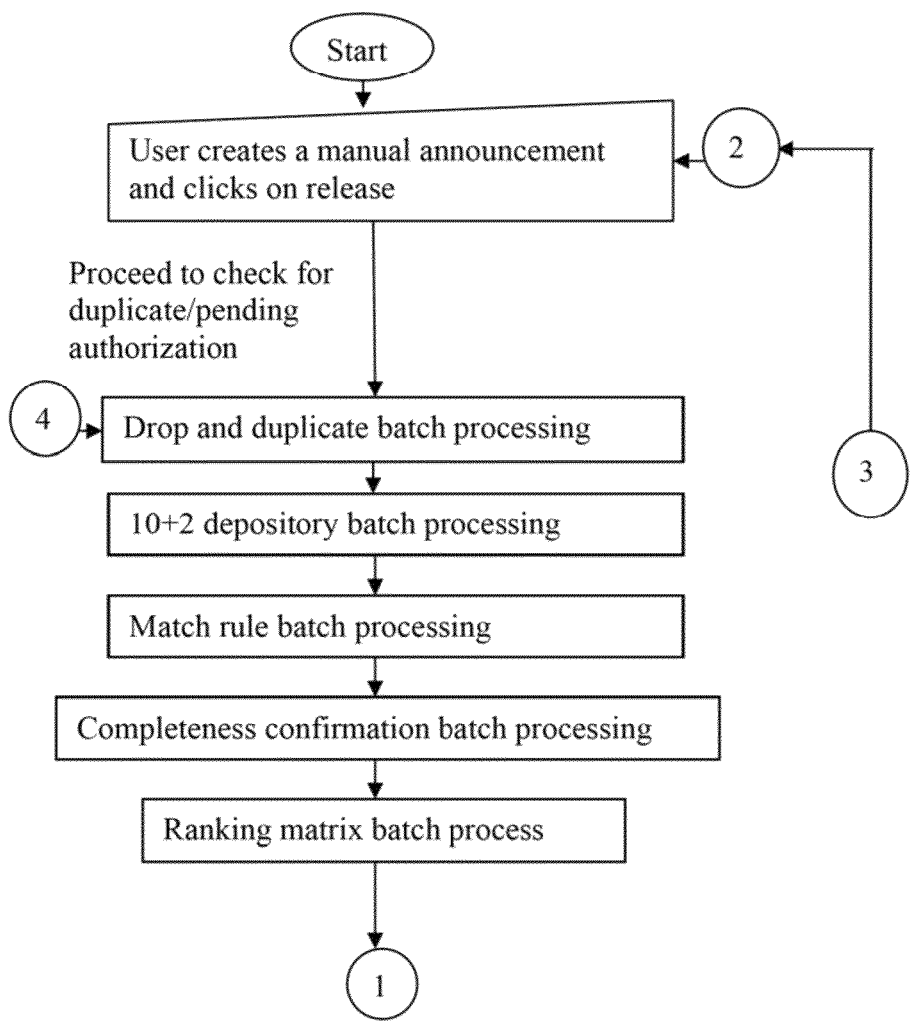
FIGS. 7 (a), (b), (c), (d), (e) (f) and (g) describe a single authorization process flow diagram in accordance with an embodiment.
Figure 7B:
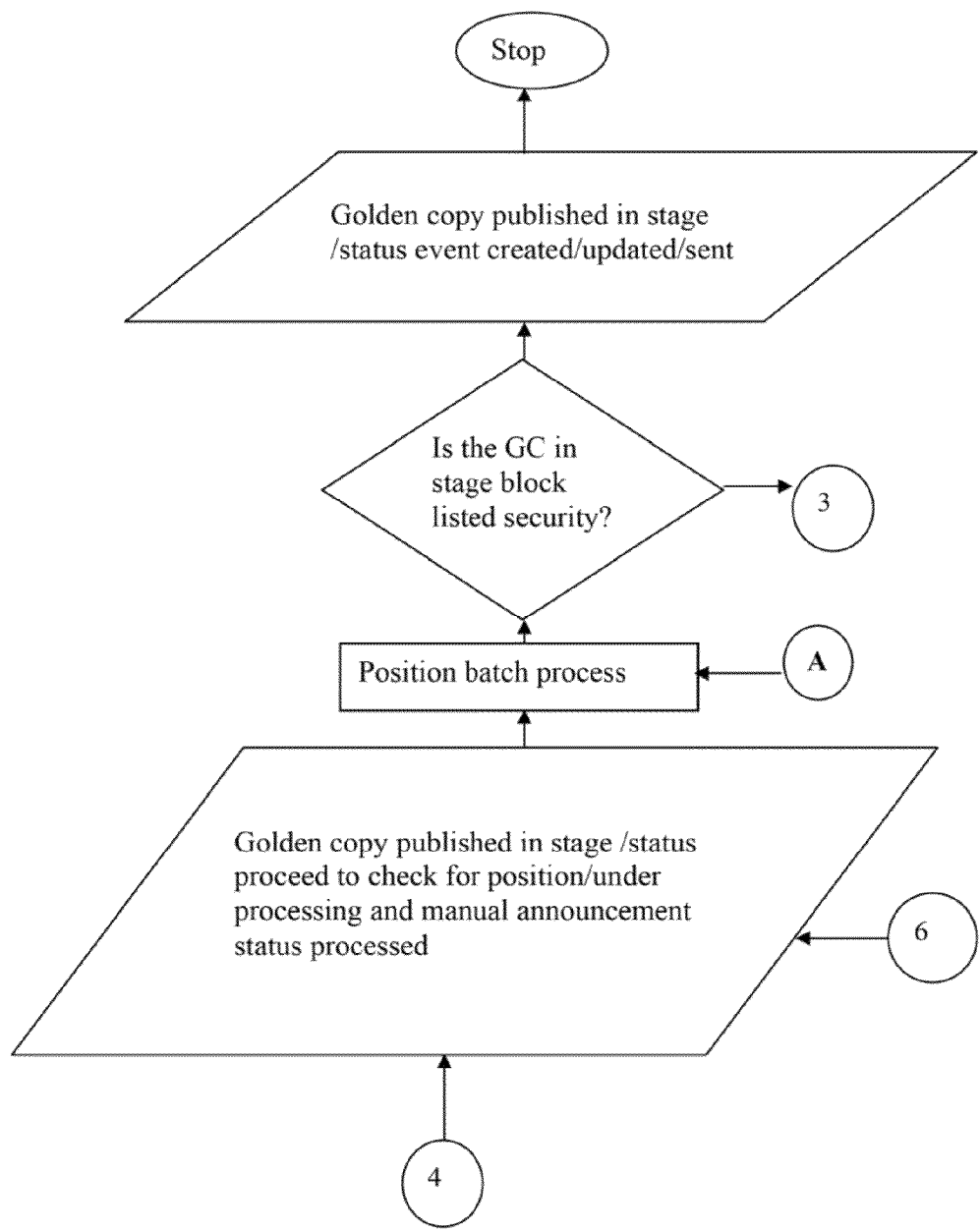
Figure 7C:
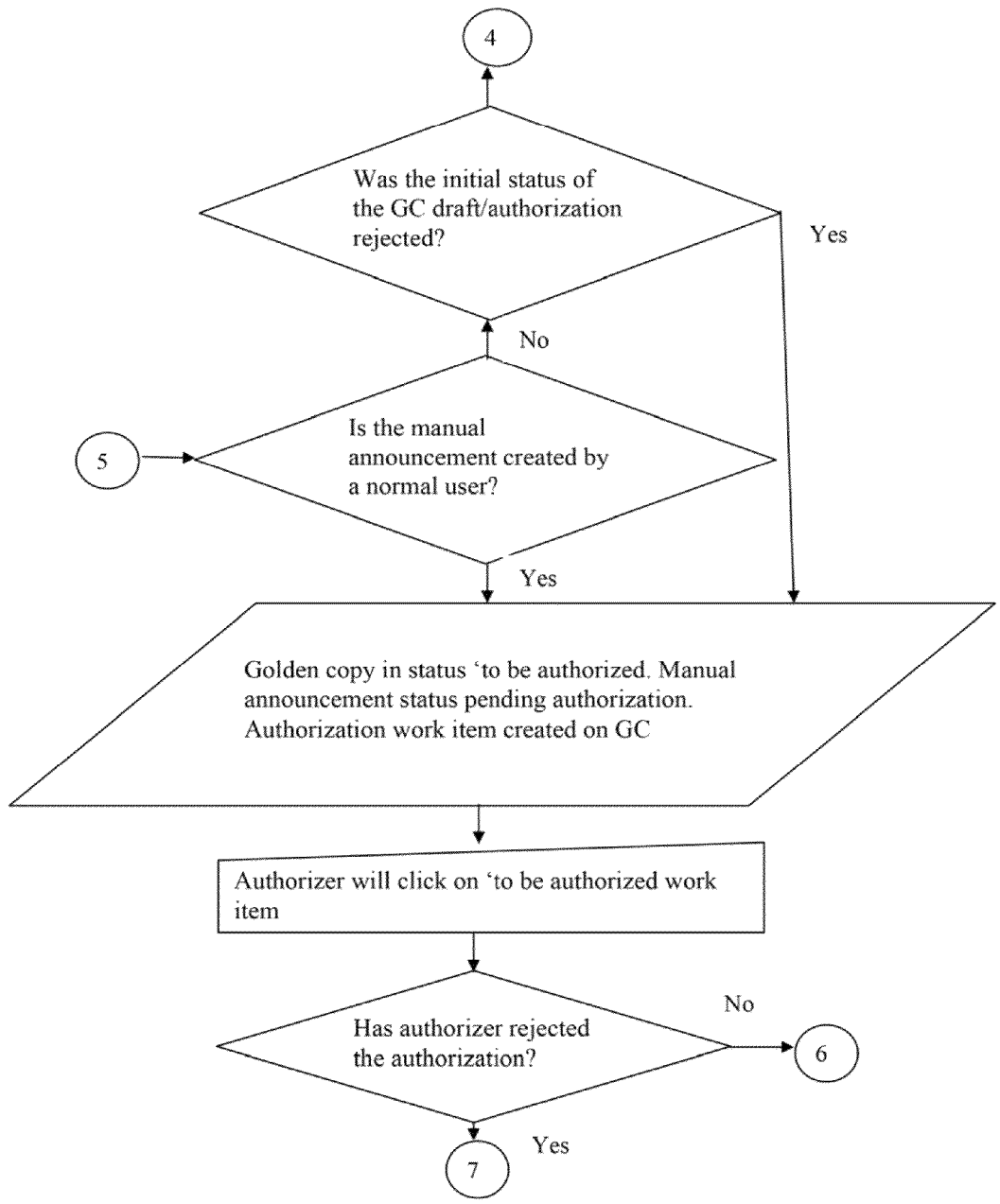
Figure 7D:
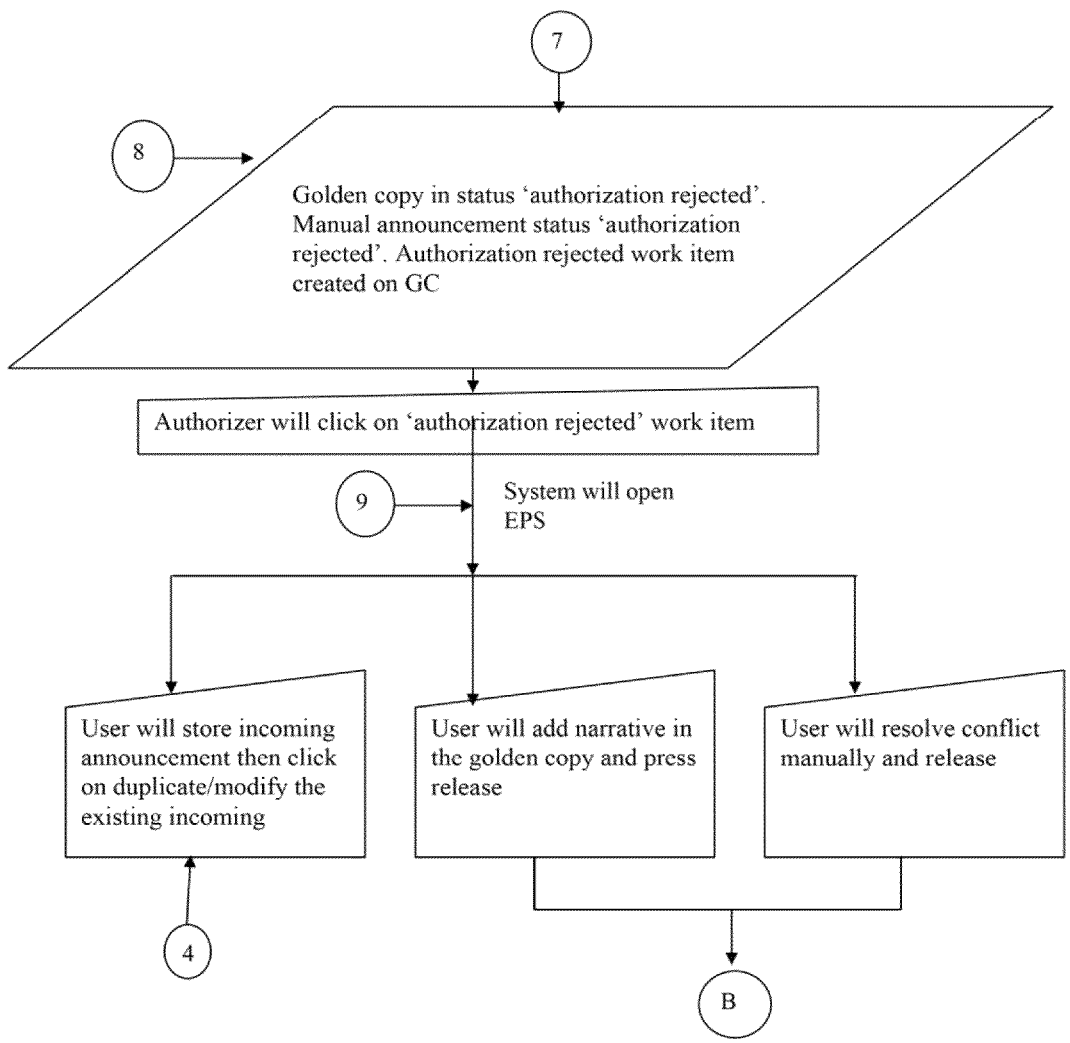
Figure 7E:
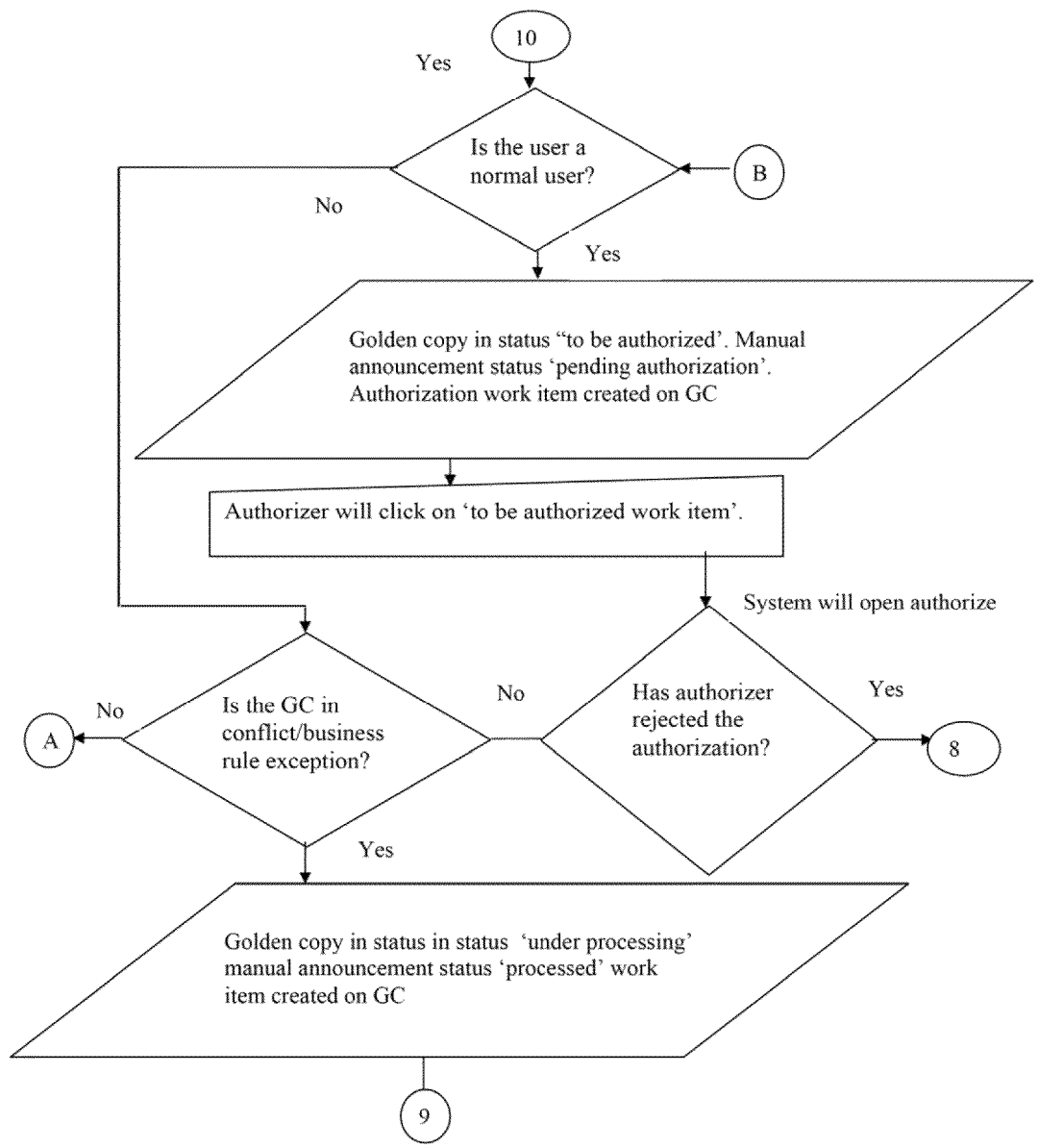
Figure 7F:
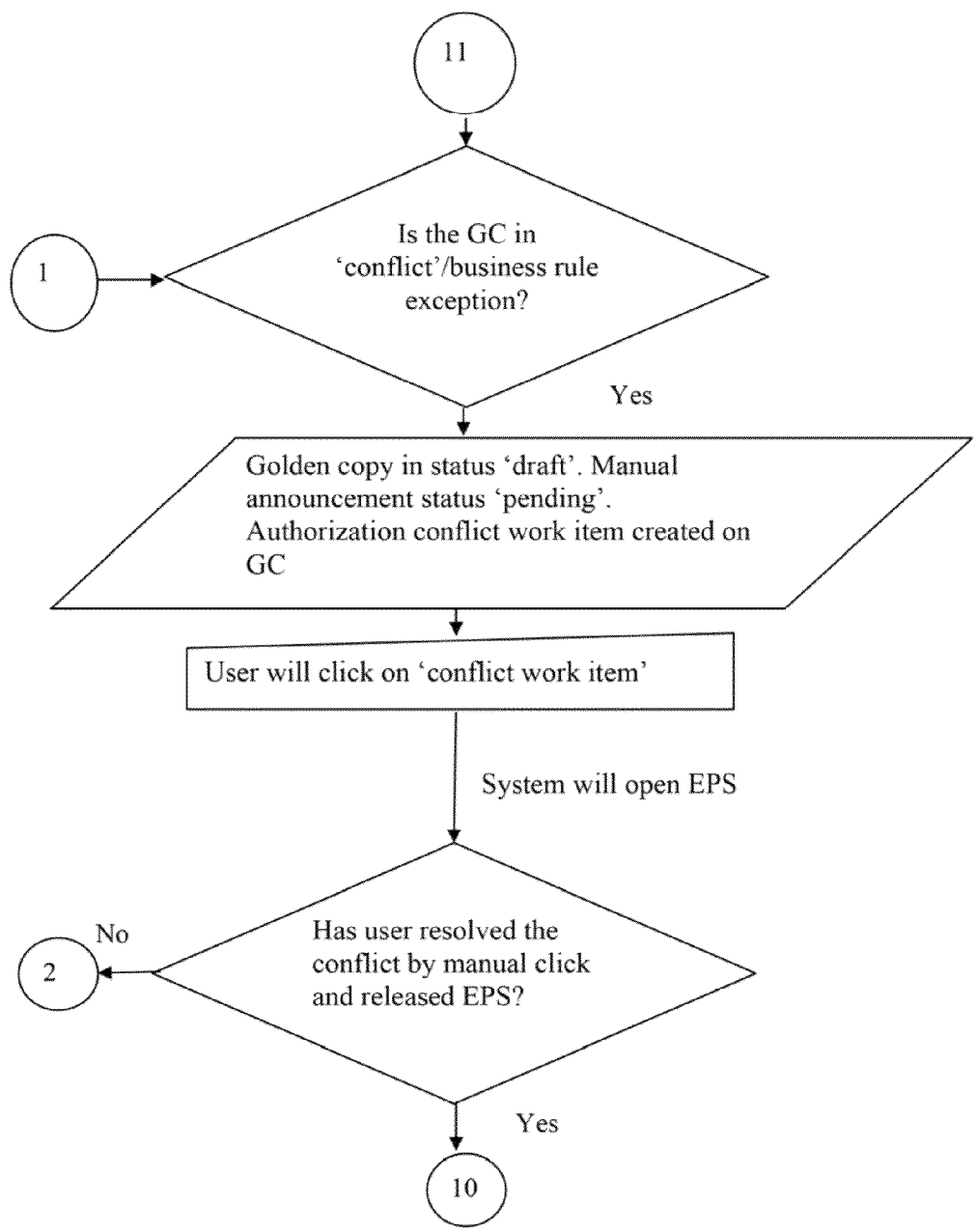
Figure 7G:
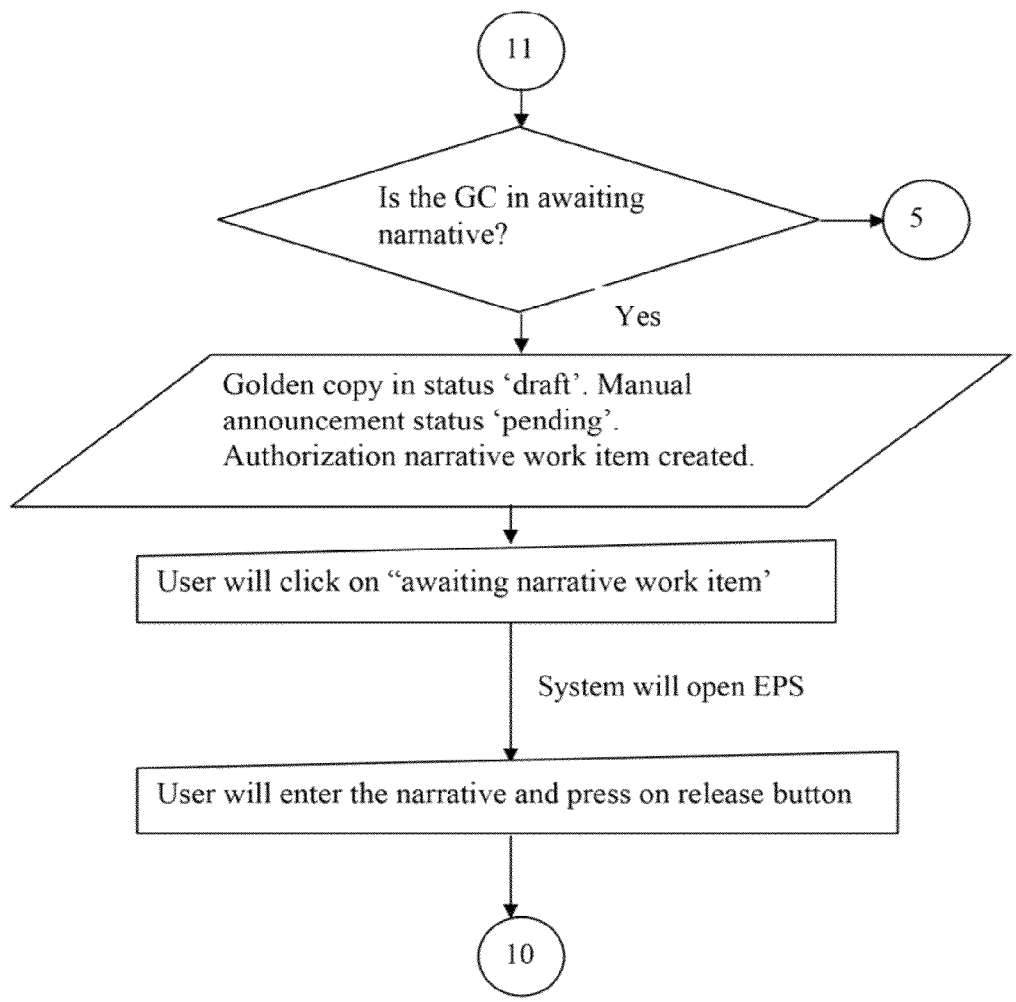

Referring now to FIGS. 6(a), 6(b), and 6(c), an exemplary flow diagram of a ranking matrix process as applied on data fetched from multiple sources is explained. The process may initiate with the user creating a manual announcement and thereon releasing it. As discussed above, a drop and duplicate process may be executed by the processing unit 102, followed by a narrative matching process and a check for completeness. As show in step 1 and step 1.1 of FIG. 6(a), before applying the ranking matrix process on above processed data, a check on the ranking attribute rules may be performed. If the rules are found to be explicitly defined, a check may be made in step 1.2 regarding whether multiple announcements from the same source and same timestamp are received. If the rules are not determined to be properly defined in step 1.1, or in case of multiple announcements being received from the same source and same timestamp in step 1.2, a work item for user for a manual action may be raised in step 1.3.

If a single announcement is received from the same source, logic to decide for the promotion and confirmation of the associated attribute value to the Golden Copy may be based upon predefined ranking attribute rule of the ranking matrix process. For each attribute, groups may be formed by adding the weights of the all the sources providing the same value. Here number of groups formed may be equal to the number of different values provided by different sources and each group may have the weight equal to the sum of weights from each source providing the value present in the group.

Referring now to FIG. 6(b) and following explanation from FIG. 6(a), for sources providing different attribute values, a combined weight may be computed in step 1.4 by subtracting the weight of second highest group from the weight first highest group. Next in step 1.5, if the combined weight of the attributes is determined higher than the predetermined promotion threshold value, as defined in the ranking attributes rule, the attribute value may be selected from the highest group weight and promoted to the Golden Copy. If the significance level of the attribute value is mandatory or mandatory to send, control may proceed from step 1.5 to step 1.7 where the combined weight may be compared against the confirmation threshold and only if the combined weight is greater than or equal to confirmation threshold, the value in the Golden Copy may be marked confirmed. If in step 1.7, processing unit 102 determines that the combined weight for the attribute is less than the confirmation threshold and significance level of the attribute value is mandatory or mandatory to send, the attribute status may be changed from "Confirmed" to "Unconfirmed" and the work item for manual action may be raised.

However if the combined weight (is less than the promotion threshold in step 1.5, then total weight may be calculated in step 1.10 that may be the sum of weight of attribute from each source. If total weight is greater than or equal to task level (for example, one of the criteria defined in the ranking matrix rule), in step 1.11, a conflict may be raised for that attribute in step 1.12 and it may be left for the user to decide which value should be present in the Golden Copy. Conversely, as shown in step 1.13, if the total weight is determined less than the task level, the system may verify if any other attribute exists for cleansing or scrubbing action, and if the system reports of any such attribute existing, it may invoke in step 1.14 comparison and processing of the corresponding attribute in a way discussed in aforementioned steps of data cleansing/scrubbing.

Also, as shown in FIG. 6(*c*), if an attribute is found to be an optional one (as shown in step 1.6), it may be promoted to the Golden copy. For a non optional attribute, for example a mandatory or mandatory to send attribute, the processor unit 102 may compute in step 1.7 whether the combined weight of said attribute is greater than or equal to confirmation threshold. If the combined weight is computed to be less than the confirmation threshold, control may proceed to step 1.8 where it may be verified whether the attribute status gets changed from confirmed to unconfirmed. If attribute status is determined to remain "confirmed", the attribute may be promoted to the Golden copy, as depicted in step 1.9; while, the attribute showing the unconfirmed status may undergo cleansing/scrubbing operation again.

FIGS. 7 (*a*), (*b*), (*c*), (*d*), (*e*) (*f*) and (*g*), shows a single authorization process flow diagram. As shown, the user may create an announcement and release it. Now, the announcement may proceed to a preliminary check for duplicates, heldness and narrative matching before being processed by ranking matrix batch process. The Golden Copy may be checked for any conflict, missing narratives and whether it is in line with the predetermined business rules. If any error occurs, the Golden Copy may be assigned a status of "Draft" while the manual announcement status is set as "Pending Authorization". Accordingly a work item may be raised for the user to intervene. If the user is able to successfully resolve the errors, the status of Golden Copy may get changed to "To be authorized" while the manual announcement status is again "Pending Authorization". The Authorizer may check for errors resolved by the user in the Golden Copy for conflicts, missing narratives and exception of announcement to business rule. If the changes are confirmed by the authorizer, the status of Golden Copy may get changed to "under processing" while the manual announcement status is changed to "processed". However, if the authorizer rejects the authorization, the statuses may get accordingly changed and the user may make the requisite improvements by way of modification or addition of narratives, if found missing and resolve the conflict on his own.

In other scenario, if the Golden Copy is not reported with any conflict or of any missing narrative and is ready to be published, an assessment may be made if the announcement was made by a power user. If yes and the Golden Copy was not in draft stage or authorization rejected or to be authorized stage, it may get published and its status may get changed to either "/Sent". However, if the user is a normal user, again the Golden Copy may proceed for authorization wherein the authorizer intervenes to resolve the issue, as explained above.

Another aspect of the disclosure provides a mechanism for providing a consolidated view of data/narratives received from various sources and the data/narratives present in the golden copy in a table based interface, referred to as an Event Preview Screen. The interface may enhance the readability of the data which gets displayed in the SWIFT format sequence. Further, each of the sequences/options or sub options may be displayed with proper header. The display interface may allow the user to select data from multiple sources in case of any conflict. The user may be further empowered to add the standard narrative text, edit the narratives directly into the Golden Copy and/or promote the best narratives received from various sources into the Golden Copy. In one alternate embodiment, the interface may display the narratives of the replaced messages and highlight the differences between current and previous narratives in case of change between the replaced and replacement messages.

The other enabling feature of the Event Preview Screen highlights the changes in attributes/narratives for easy authorization decision. All the erroneous attributes, referring to those which fail to comply with predefined business validation for the event, may get highlighted and furthermore, the description for the error so caused may get displayed. In an embodiment, the Event Preview Screen may make it possible to perform various operations (like, for example, modifying the existing source data, creating duplicate of existing source data, view of original message of incoming as it was received from external world, and view of final message generated based on Golden Copy data, Audit View, attribute level and option level conflict resolution, addition of new standard text narratives directly into the GC etc) from a single screen.

In other enabling embodiment, the system may allow direct updating of data into the Golden Copy for predefined fields. This facility may be especially usable where Business entity needs to provide its own information in the Golden copy message (e.g. some internal deadline for response). The screen may enable the user to view all the information regarding the processing status of the incoming messages and the Golden Copy. Even various status of the attributes like successfully promoted, conflict, manually promoted by user and required authorization, manually promoted by user and is authorized may be easily identifiable with Event Preview Screen as it displays meaningful icons to increase readability of these status. Further, it may also highlight the source name to convey to user various status of the incoming announcement like Draft (undergoing manual editing by a business user), Option Mismatch etc apart from highlighting the instrument related information like expired instrument, non holding as of current date and so on.

The Event Preview Screen or the display interface 103 may be broadly divided into three sections, namely
1. Summary
2. Main Section comprising of Attribute headings, Source headings, Golden Copy and Incoming data
3. Toolbar Summary Section This may be a fixed area of the Event Preview Screen that show the key attributes of the event being viewed. Fields that are displayed in the Summary section may be:
ISIN
Security number derived from instrument hierarchy (Common Code)
Security Description
Event Type
Mandatory/Voluntary
Depository
Event Status
Default Flag (if the security is in default)
Maturity Flag (if the security has matured)
Ranking Matrix information (Market, Instrument type, Internal flag).
Logged in user information
Indication of the incoming announcement in case it is under processing.

Figure 8B:
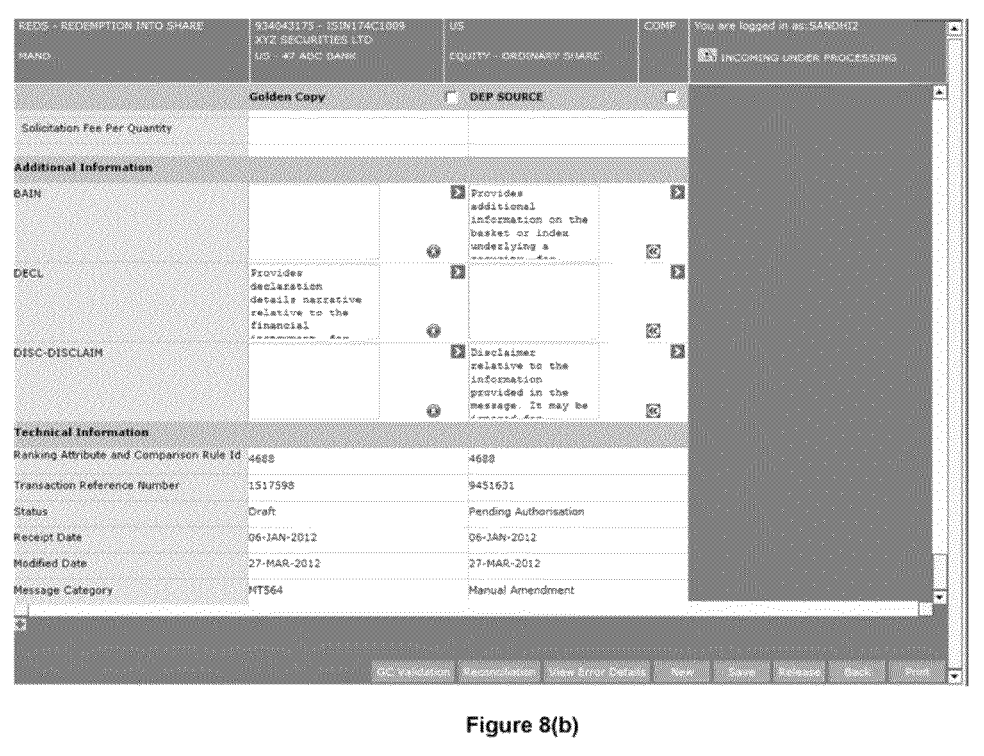
Figure 8C:
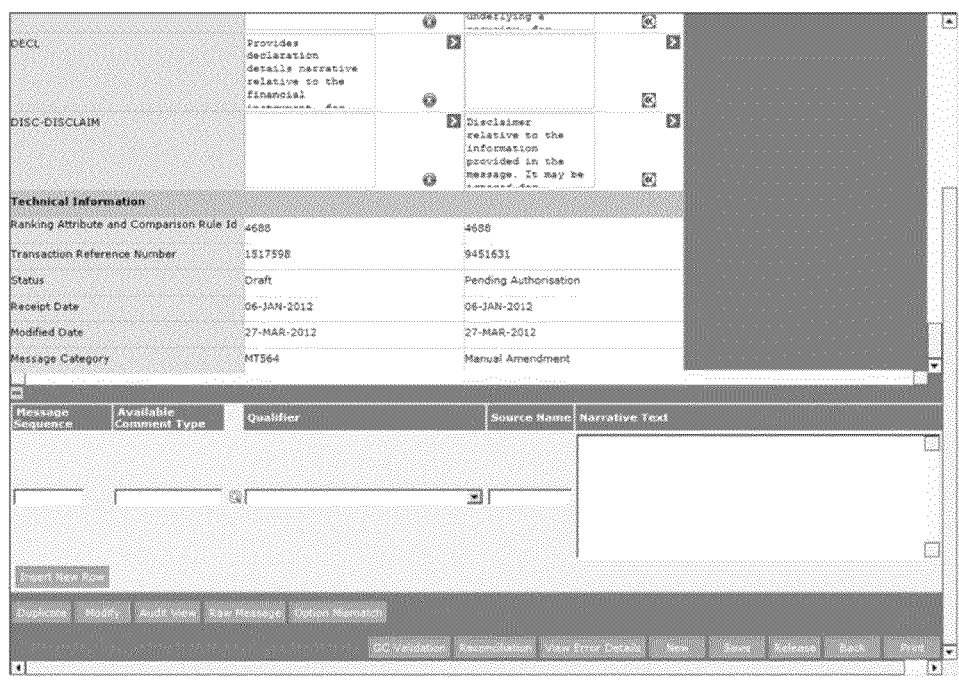
FIGS. 8 (a), (b) and (c) provide a sample visual presentation of different sections of an Event Preview Screen in accordance with one disclosed embodiment.

FIGS. 8 (a), (b) and (c) present a visual representation of summary section of Event Preview Screen.

Main Section

Next, the main section may display:
Attribute Headings—This part of the Main section may provide the name of all the attributes that should be present in the Golden Copy as per the Ranking Matrix Setup and the narratives that are present in either incoming announcement or Golden Copy. The different font may represent significance of the attributes defined in the Ranking Matrix Setup. For example Mandatory to send attribute may be displayed in Bold and Italics, Mandatory attribute may be displayed as Bold, Optional and view only attributes may be displayed in normal font. Additionally different colors may be chosen to identify between the headers and the actual attribute names. Within this section there may also be a technical information section which displays the attribute names for information such as ranking attribute rule id, Golden Copy and incoming announcement reference number, their status, receipt date, last modified date and message category.

FIGS. 8 (a), (b) and (c) provide a sample visual presentation of the Attribute heading of Event Preview Screen.

Source Headings—This section may display the name of each data source visible in the EPS. For Golden Copy, source name may be displayed as "Golden Copy". Referring particularly to FIG. 8(b), this section may have a check box available next to each source name, clicking on which may display the buttons applicable for the selected source like view raw message of the selected source, create duplicate of the selected source, modify the selected source, resolve option mismatch in case the particular source is in option mismatch. Additionally the source names may be highlighted in different colors in order to indicate that the source announcement is being edited by the user or is in Option Mismatch with Golden copy data (i.e. user intervention is required to match those option which could not be matched by the system).

Golden Copy and Incoming Data Section—This section may provide a single overview of Golden copy data and all participating source data that has been received from various data sources related to a particular event along with any conflicts or problems. This screen may display the values of only those attributes which are part of the Ranking Matrix being configured in the Ranking Matrix Setup screen. The columns may be ordered so that the Golden Copy is the first, and rest of the incoming announcements will be in the order in which they have been received in the system.

This section may make use of various icons in order to indicate several statuses of the attributes. The significance of the icons used within this section is as follows:

In case a conflict with an attribute occurs, the system may show the value used in the Golden Copy in Golden Copy column to display the current state of each attribute are as follows:

✓—Indicates attribute is OK and no conflict exists;
?—Indicates Golden Copy does not contain the MS (Mandatory to Send) attribute value as no data feed provided the value.
X—Indicates that the system identified a problem with the attribute and an unresolved conflict exists;
✓$_U$—Indicates that a user manually selected this value to be used in the Golden Copy;
X$_U$—Indicates that the conflict has been resolved by a user, but the change is pending authorization.
C—Indicates that the MS/M attribute present in the Golden Copy is confirmed.
UC—Indicates that the MS/M attribute present in the Golden Copy is unconfirmed.

Toolbar Section

This section may contain the following buttons/Icon:
Icon+—This icon may open user narrative section which enables user to add predefined standard text narratives directly to the GC. User may add also add his own narrative.
Duplicate—This button may be used to create the duplicate announcement of the selected source from the source headings section. This may be applicable only for incoming sources.
Modify—This button may be used to modify the incoming announcement of the selected source from the source headings section. This may be applicable only for incoming sources.
Audit View—This button may give the audit details of the Golden Copy.
Raw Message—This button may display the raw message of the selected source from the source headings section.
Option Mismatch—This button may open the option mismatch screen for the selected source from the source heading section in case the selected source is in option mismatch. This may be applicable only for incoming sources.
GC Validation—This button may highlight the erroneous attributes of the Golden Copy.
View Error Details—This button may open a GUI containing the detailed description for the list of errors and warnings present in the GC.
New—This button may be used to create a new source from the EPS.
Save—This button may save the changes made by user by manual conflict resolution or narrative addition/modification/deletion or update of editable values directly into the Golden Copy.
Release—This button may save and release the changes made by user by manual conflict resolution or narrative addition/modification/deletion or update of editable values directly into the Golden Copy to be verified by the authorizer.

The illustrative embodiments provide a mechanism for dynamically selecting which attributes to display in a table based user interface. Thus, the illustrative embodiments may be utilized in many different types of data processing environments including a distributed data processing environment, a single data processing device, or the like. In order to provide a context for the description of the specific elements and functionality of the illustrative embodiments, FIGS. 9, 10, 11, 12 and 13 are provided hereafter as exemplary environments in which exemplary aspects of the illustrative embodiments may be implemented. While the description following the figures shall represent implementation of a mechanism that dynamically selects which properties to display in a table based user interface, this is only exemplary and is not intended to state or imply any limitation with regard to the features of the present disclosure.

The exemplary embodiment herein shall depict the application of ranking matrix process applied on three sources (Agent, Depository and Manual Announcement created by the user from a manual source) linking to the same golden copy and view of their corresponding Event Preview Screen after processing of each source FIG. 9 as shown depicts ranking matrix rule that are applicable as a part of ranking matrix process for promotion of an attribute to the Golden Copy. Here the event type is declared as "Stock Dividend", the promotion threshold value determined as 6, confirmation threshold value as 8 and task level threshold being 4.

Next, the details of each attribute along with their corresponding weights assigned to each source are depicted in FIG. 10. The significance level of each attribute value may be adjudged along with the option type and movement. Thereafter weights may be assigned for three different sources. The attributes that are emphasized and explained in the example are as follows:
1. Record Date of Seq D
2. Resulting Security Number of Seq E
3. Dispositions of Fractions of Seq E
4. Payement Date of Secmove (Seq E1) and Cashmove (Seq E2)
5. Additional for Existing Securities of Secmove (Seq E1)

Once the incoming announcement from agent source arrives in the system, it may pass through the following processes before the ranking matrix processing is applied:
1. Data Provider Mapping, Event mapping and Security Mapping
2. Duplicate Drop and Heldness check
3. Match Narrative process which results in creation of the Golden Copy template based on the received incoming.

Now, the Ranking Matrix process may be applied on the received incoming and based on the ranking matrix rule set up (shown in FIG. 9) following results may be reached at (shown in FIG. 11):

Record Date being the Mandatory attribute and its weight being 2 which is less than promotion threshold (6) value is not promoted to GC and no conflict is raised for the missing record date.

Payment Date, Dispositions of Fractions and Additional for Existing Securities being the Mandatory to send attribute and their weight being 2 which is less than promotion threshold (6), their values are not promoted to GC. Since these attributes are Mandatory to send and they are missing in the GC, GC is blocked from STP (Straight through Processing).

No Work Item is raised for the user as the incoming announcement is received from a low weight source. Work Item is raised only if total weight (sum of weight of all the sources)>=Task Level and in this case total weight is 2 which is less than task level (4).

Missing MS values are highlighted in the EPS and missing value is depicted using a question mark icon.

Payment Date being the SWIFT mandatory field, it is defaulted to Unknown even if the value cannot be promoted from the linked source.

Figure 12:
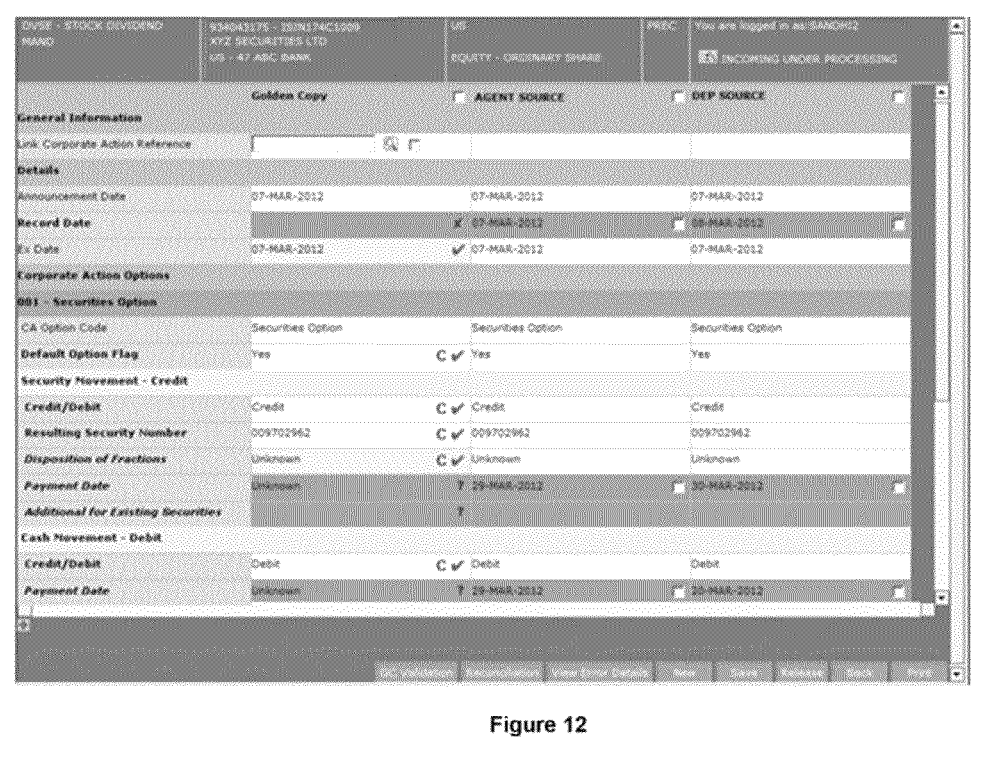

Referring next to FIG. 12, second incoming announcement from depository source may arrive in the system and pass through the processes explained in step 1 and finally the ranking matrix process may be applied. Based on the ranking matrix rule set up (shown in FIG. 5) following may be the results, also shown in FIG. 12:

For record date and payment date depository source has provided different information than the agent source. Combined weight will be calculated which is weight of depository source−weight of agent source (6−2)=4. Since the combined weight (4) is <promotion threshold (6), values will not be promoted into the GC and GC will be blocked.

Since the total weight (6+2=8) is >Task Level (4) a Work Item will be raised for the user to take action on the GC.

Same value of Dispositions of Fractions as that of agent is provided by the depository source, the same is promoted to GC as combined weight (6+2=8) is >Promotion Threshold (6).

Dispositions of Fractions is also confirmed as combined weight (6+2=8) is =Confirmation Threshold (8).

Figure 13:
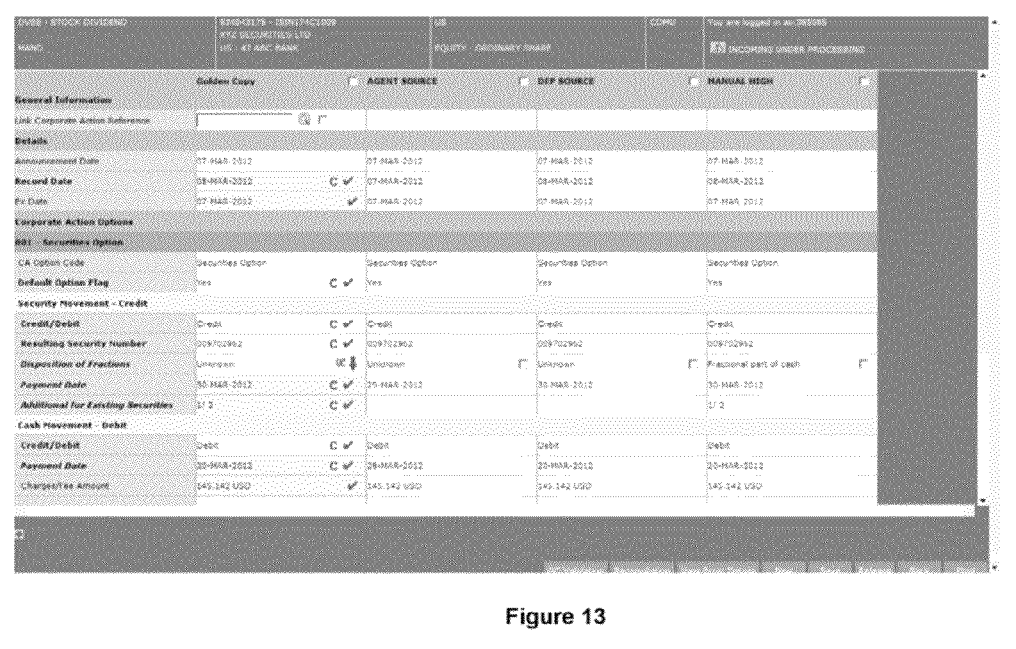

As shown in FIG. 13, the user after receiving the Work Item raised above may gather the information from the market in order to resolve the conflict in record date and payment date and provide the missing value of Additional for Existing Securities, navigate to the EPS and create a manual announcement with the information collected from the market. Manual announcement may pass through the preliminary steps before finally being processed by the ranking matrix process. Based on the ranking matrix rule set up above following may be the results:

For record date and payment date, manual source has provided same information as that of the depository source. Combined weight will be calculated which is weight of (manual source+depository source)−weight of agent source ((14+6)−2)=18. Since the combined weight (18) is >promotion threshold (6), values will be promoted into the Golden Copy.

Manual source has provided different value of Dispositions of Fractions as that of depository and agent source. Combined weight will be calculated which is weight of manual source−weight of (agent source+depository source) (14−(6+2)=6. Since the combined weight (6) is =promotion threshold (6) but <Confirmation Threshold (8), dispositions of fractions will be changed from confirmed to unconfirmed state which is depicted by a down arrow. GC will be blocked and a work item will be created for the user to take action.

Missing additional for existing securities value is provided by the manual source and since weight of manual source (14) >Promotion Threshold (6) and >Confirmation Threshold (8), the value will be promoted to GC and will be marked as confirmed.

The above disclosed exemplary techniques may provide an automated system and a method enabling field level scrubbing of data obtained from multiple heterogeneous sources for improved message processing in a corporate action announcement. They may further provide single screen view of data/narratives received from multiple sources and data/narratives promoted to the single authoritative Golden Copy for better manageability of corporate action processes. They may further provide a system enabling users to manage the narratives from a single consolidated screen view. They may further provide a system and method that allows an entity to select one attribute from one source and another attribute from other heterogeneous source for updating Golden Copy with most accurate and consistent data. They may further provide a centralized and consolidated corporate action market data processing system and method. They may further provide a system that is empowered to rank the source for their trustworthiness thereby enhancing the probability of consolidating more credible information. They may allow for real time comparison between the data retrieved from multiple sources.

The foregoing description of specific embodiments of the present disclosure has been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the claims appended hereto and their equivalents. The listing of steps within method claims do not imply any particular order to performing the steps, unless explicitly stated in the claim.

What is claimed is:

1. A method for performing data scrubbing at attribute level, comprising:
   receiving, by a processor, data containing at least one significant attribute or at least one non-significant attribute and associated values from distributed data sources, the data sources being assigned weight against each value of the at least one significant attribute or the at least one non-significant attribute; and
   applying, by the processor, a ranking matrix process to the received data, the ranking matrix process comprising:
      for sources referring to different values for a significant attribute or a non-significant attribute, computing a combined weight therefrom;
      in response to the combined weight of the significant attribute exceeding a predetermined promotion threshold value, determining if the combined weight exceeds a predetermined confirmation threshold value;
      in response to the combined weight of the non-significant attribute and the significant attribute exceeding the predetermined promotion threshold value and the predetermined confirmation threshold value respectively, promoting values associated with the non-significant attribute and the significant attribute to a final templated copy;
      in response to the combined weight of the significant attribute or the non-significant attribute being less than the predetermined promotion threshold value, computing a total weight of all values for the significant attribute or the non-significant attribute from all sources; and
      in response to the total weight exceeding a predetermined task threshold, raising a work item for a user to create a manual source and reapplying the ranking matrix process.

2. The method of claim 1, wherein the at least one significant attribute corresponds to Mandatory or Mandatory to send significance levels and the at least one non-significant attribute corresponds to Optional or View only significance levels.

3. The method of claim 1, further comprising:
   performing a preliminary mapping including at least one of source mapping, event mapping and security mapping;
   performing duplicate drop check, heldness check; and
   performing a narrative matching process before applying the ranking matrix process.

4. The method of claim 1, wherein the ranking matrix process employs a combination of a ranking attribute rule and a source weighting rule.

5. The method of claim 4, wherein the ranking attribute rule comprises a set of rules determining a list of attributes to be present in the final templated copy, the set of rules including: significance level of each attribute, the promotion threshold value and the confirmation threshold, value, task threshold value event mapping rule, source priority rule, narrative match rule, completeness and confirmation rule, constraint rule, and a source weighting rule assigning the weight to the sources against each value.

6. The method of claim 1, wherein the combined weight is computed by: selecting the distributed sources referring the different values for the significant attribute or the non-significant attribute to form a group; determining the groups, so formed, having highest and second highest weights as a first highest group weight and a second highest group weight; and subtracting the second highest group weight from the first highest group weight to derive the combined weight.

7. The method of claim 1, wherein the total weight is the sum of the weights of the values for the significant attribute or the non-significant attribute from each of the sources.

8. The method of claim 1, wherein the final templated copy along with the significant attribute or the non-significant attribute and the associated values obtained from the distributed sources are displayed on a single screen.

9. The method of claim 1, further comprising computing of a processing status of the final templated copy based on completeness and confirmation status of the significant attribute and the non-significant attribute.

10. The method of claim 1, further comprising displaying on a graphical user interface a summary section to display key attributes of an event and a main section to display source headings, attribute headings, the final templated copy and incoming data, and a toolbar section adapted to perform plurality of icon-based operations responsive to the summary section and the main section.

11. The method of claim 1, wherein the ranking process further comprises:
   in response to the combined weight of the significant attribute being less than the predetermined confirmation threshold, verifying status of the significant attribute being changed from confirmed to unconfirmed; and
   promoting values of the significant attribute to a golden copy if the status of the significant attribute remains confirmed or reapplying the ranking matrix process if the status of the significant attribute is changed to unconfirmed.

12. A system for performing data scrubbing, comprising:
   a hardware processor; and
   a memory storing instructions, wherein the hardware processor is configured by the instructions to:
      provide an input interface configured to receive, for an event, data containing at least one significant attribute or at least one non-significant attribute and associated values from distributed data sources;
      apply a ranking matrix process for determining values associated with the at least one significant attribute or the at least one non-significant attribute to be promoted to a final templated copy based upon a combination of a predefined ranking attribute rule and a source weighting rule, wherein the ranking matrix process comprises:

for sources referring to different values for a significant attribute or a non-significant attribute, computing a combined weight therefrom;

in response to the combined weight of the significant attribute exceeding a predetermined promotion threshold value, determining if the combined weight exceeds a predetermined confirmation threshold value;

in response to the combined weight of the non-significant attribute and the significant attribute exceeding the predetermined promotion threshold value and the predetermined confirmation threshold value respectively, promoting values associated with the non-significant attribute and the significant attribute to a final templated copy;

in response to the combined weight of the significant attribute or the non-significant attribute being less than the predetermined promotion threshold value, computing a total weight of all values for the significant attribute or the non-significant attribute from all sources; and in response to the total weight exceeding a predetermined task threshold, raising a work item for a user to create a manual source and reapplying the ranking matrix process; and displaying the final templated copy along with the data received from the distributed sources on a graphical user interface, the graphical interface including a summary section to display key attributes of the event and a main section to display source headings, attribute headings, the final templated copy and incoming data, and a toolbar section adapted to perform a plurality of icon-based operations responsive to the summary section and the main section.

13. The system of claim 12, wherein the summary section displays the key attributes including security number and description, event type, attribute significance, depository, event processing status, default flag, maturity flag, the ranking matrix information, user information and indication of incoming data under processing.

14. The system of claim 12, wherein the main section displays the attribute headings including attributes that get promoted to the final templated copy, associated significance levels, reference information for the final templated copy and the incoming data, the processing status thereof, receipt date, last modified date and message content.

15. The system of claim 12, wherein the main section further displays significance level of each attribute with specific font characteristics.

16. The system of claim 12, wherein the main section displays the source headings including names of the distributed sources and a check box positioned next to a source name displaying a content corresponding to an underlying function of a source selected.

17. The system of claim 12, wherein the final templated copy and the incoming data are rendered with a plurality of icons responsive to show status of an attribute corresponding to any conflict raised, user intervention, pending authorization, promotion of attribute to the final templated copy and absence of data from the source.

18. The system of claim 12, wherein the plurality of icon based operations responsive to the main section corresponds to: promoting standard data directly to the final templated copy by the user, creating duplicate or making modifications to the event for the source selected in the source heading section, displaying raw messages, audit details, option mismatch screen, highlighting erroneous attributes along with associated error details and underlying functions associated with user resolution of raised conflicts or edits to data directly promoted to the final templated copy.

19. The system of claim 12, wherein the ranking process further comprises:

in response to the combined weight of the significant attribute being less than the predetermined confirmation threshold, verifying status of the significant attribute being changed from confirmed to unconfirmed; and promoting values of the significant attribute to a golden copy if the status of the significant attribute remains confirmed or reapplying the ranking matrix process if the status of the significant attribute is changed to unconfirmed.

20. A non-transitory computer readable medium embodying a program executable in a computer for performing data scrubbing at attribute level, the program comprising computer executable instructions for:

receiving data containing at least one significant attribute or at least one non-significant attribute and associated values from distributed data sources, the data sources being assigned weight against each value of the at least one significant attribute or the at least one non-significant attribute; and applying a ranking matrix process to the received data, the ranking matrix process comprising:

for sources referring to different values for a significant attribute or a non-significant attribute, computing a combined weight therefrom;

in response to the combined weight of the significant attribute exceeding a predetermined promotion threshold value, determining if the combined weight exceeds a predetermined confirmation threshold value;

in response to the combined weight of the non-significant attribute and the significant attribute exceeding the predetermined promotion threshold value and the predetermined confirmation threshold value respectively, promoting values associated with the non-significant attribute and the significant attribute to a final templated copy;

in response to the combined weight of the significant attribute or the non-significant attribute being less than the predetermined promotion threshold value, computing a total weight of all values for the significant attribute or the non-significant attribute from all sources; and in response to the total weight exceeding a predetermined task threshold, raising a work item for a user to create a manual source and reapplying the ranking matrix process.

* * * * *